Oct. 14, 1952     G. BRINKMANN     2,613,554
BORING MACHINE

Filed June 27, 1947     18 Sheets-Sheet 1

INVENTOR
Guenther Brinkmann
By Carlson, Pitzner, Hubbard & Wolfe
ATTORNEYS

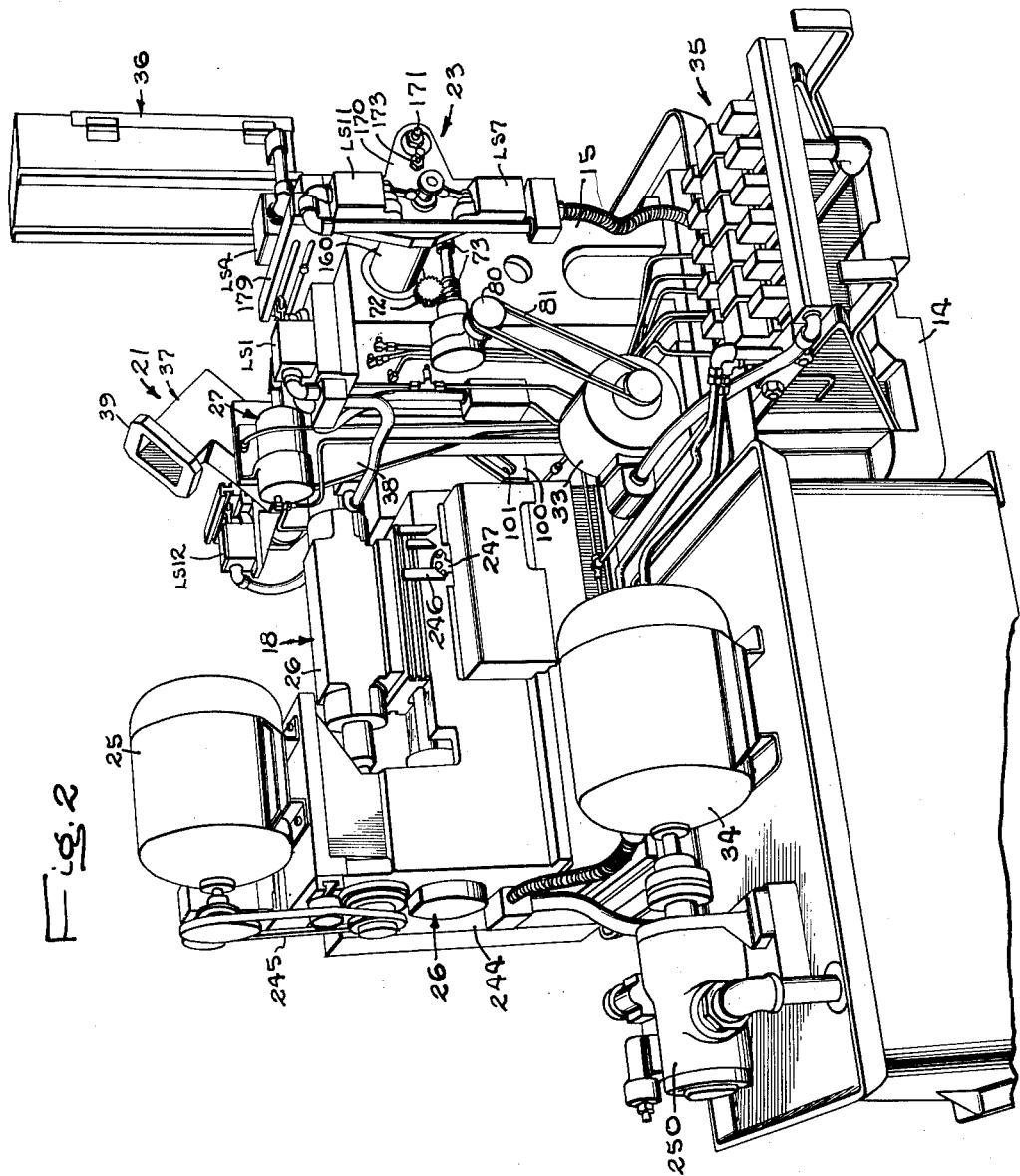

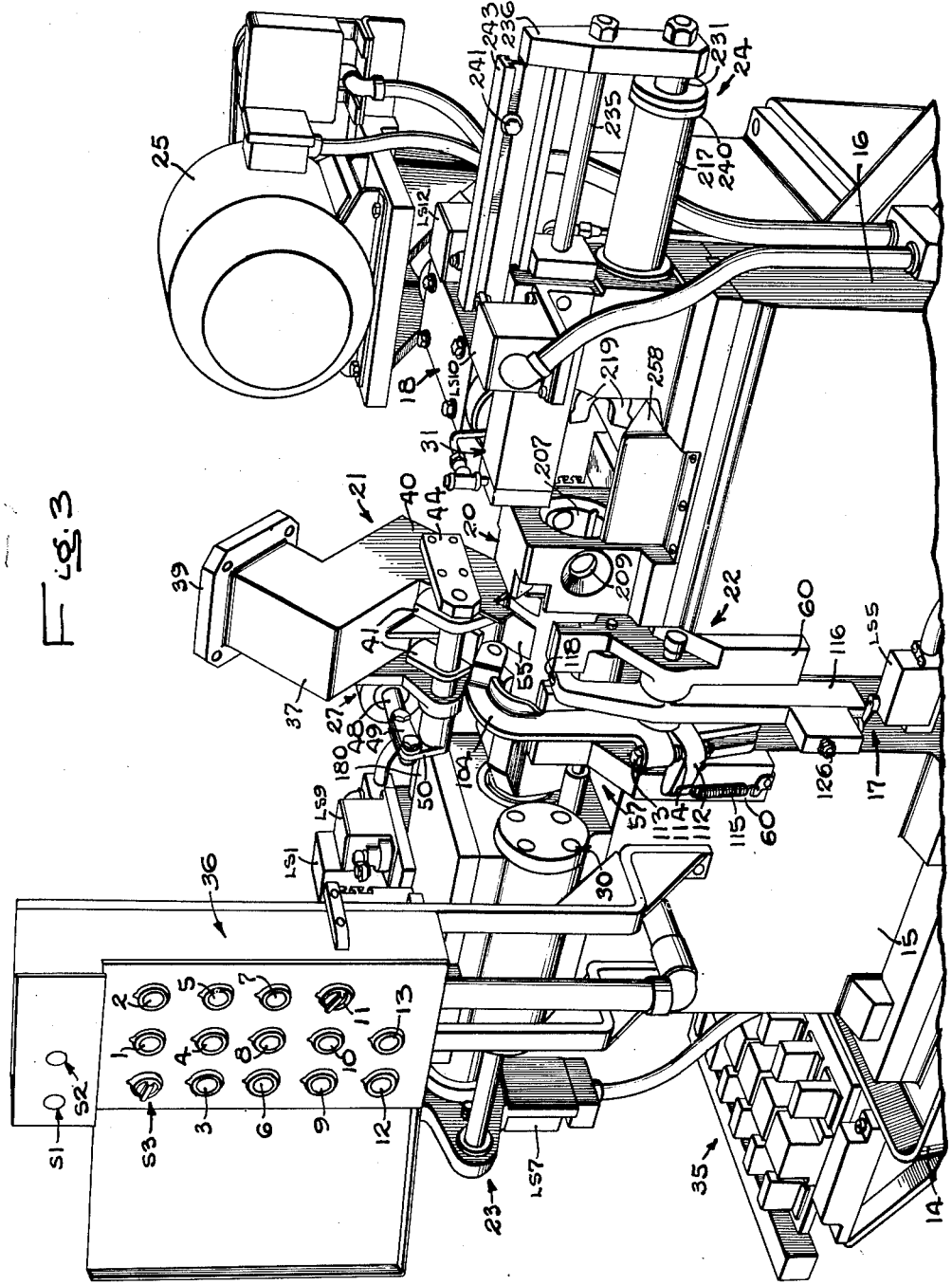

Oct. 14, 1952        G. BRINKMANN        2,613,554
BORING MACHINE
Filed June 27, 1947        18 Sheets-Sheet 4
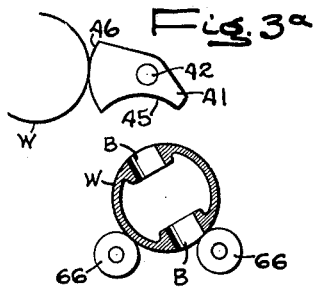
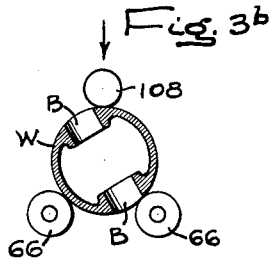
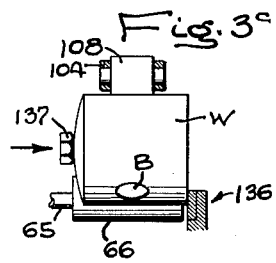
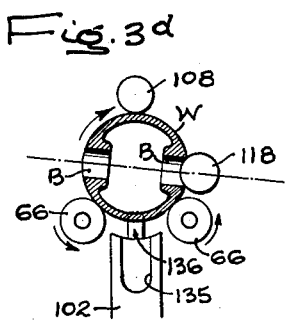
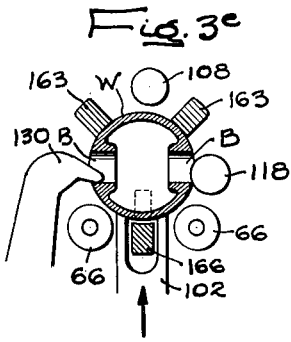
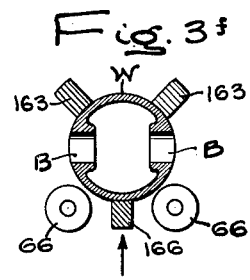
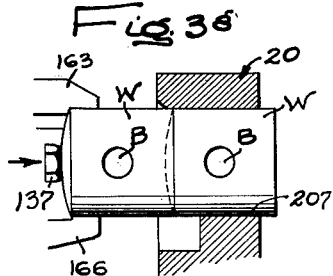
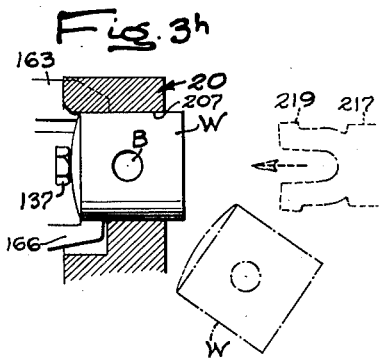
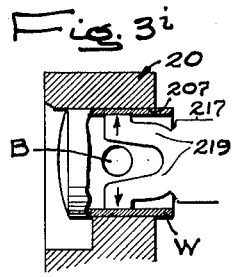
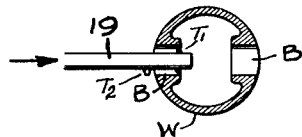
INVENTOR
Guenther Brinkmann
By Carlson, Pitzner, Hubbard & Wolfe
ATTORNEYS

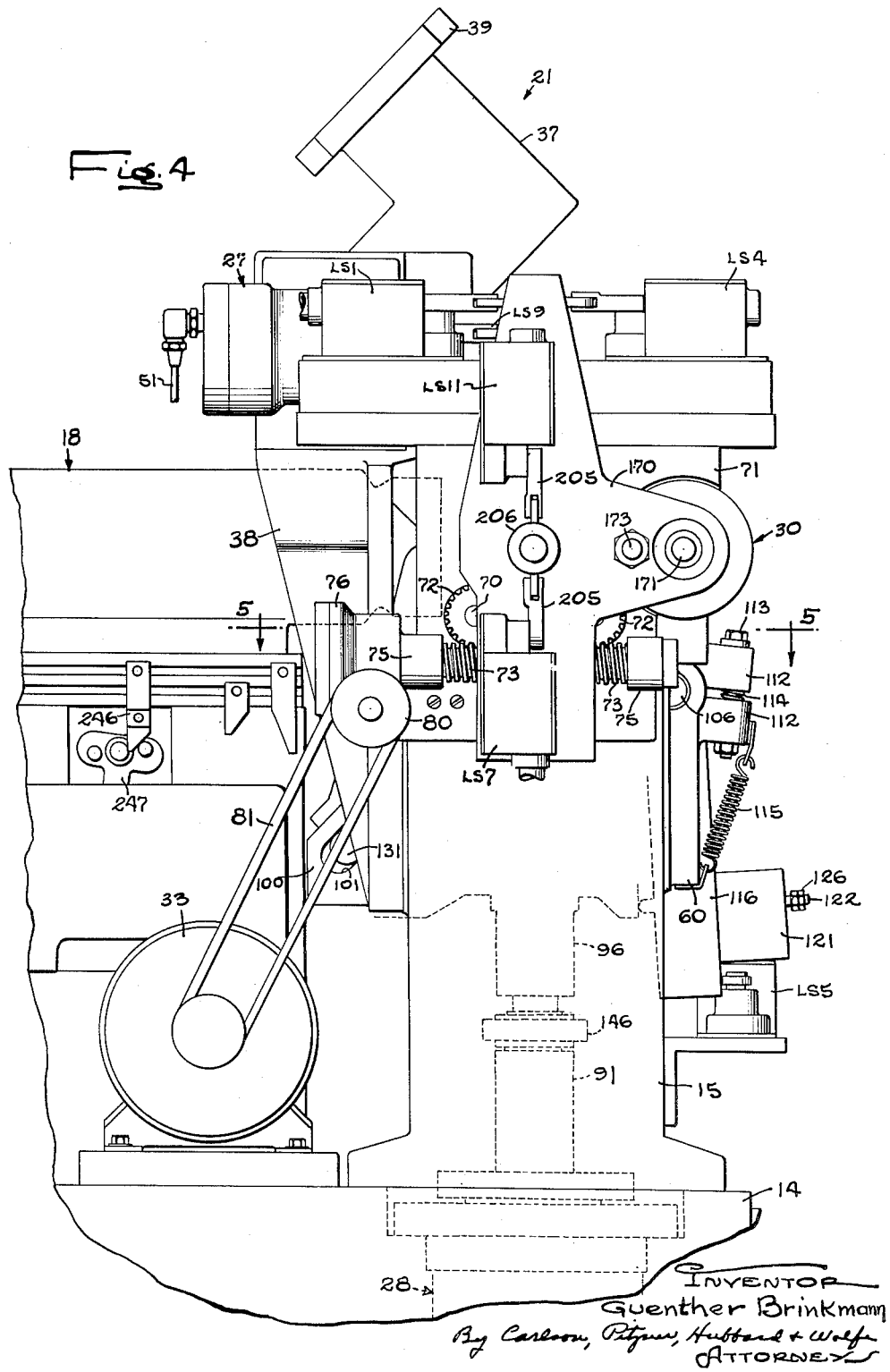

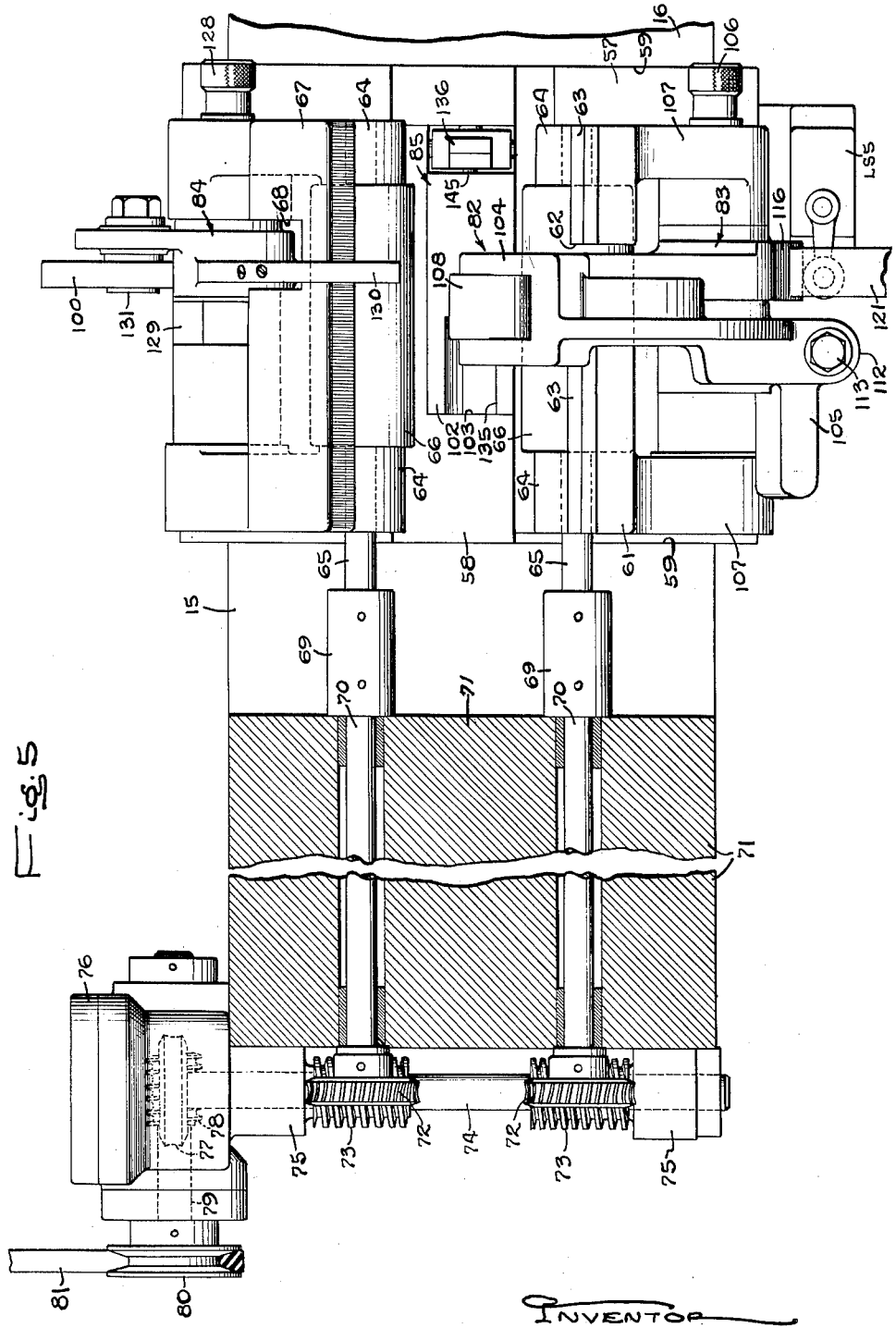

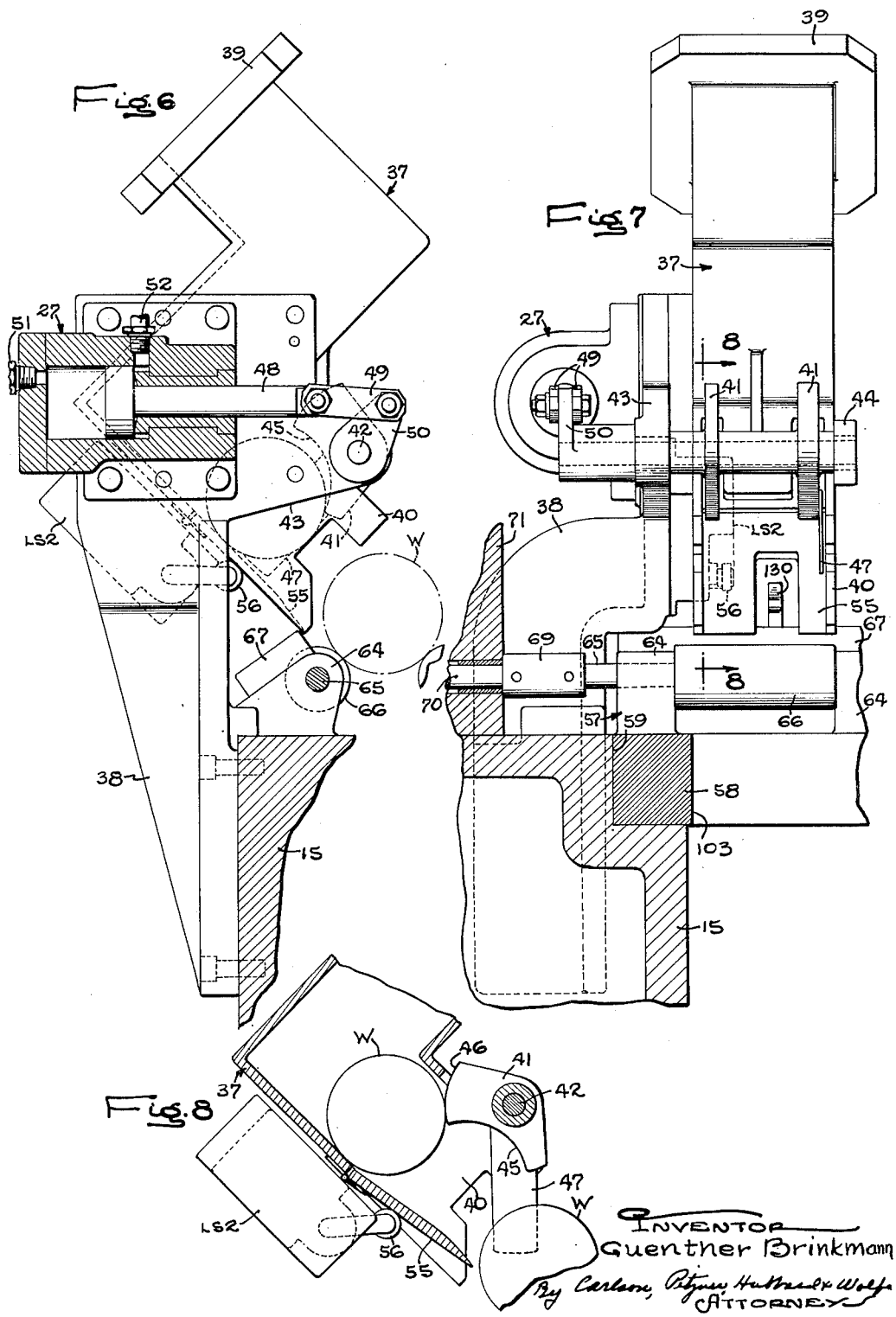

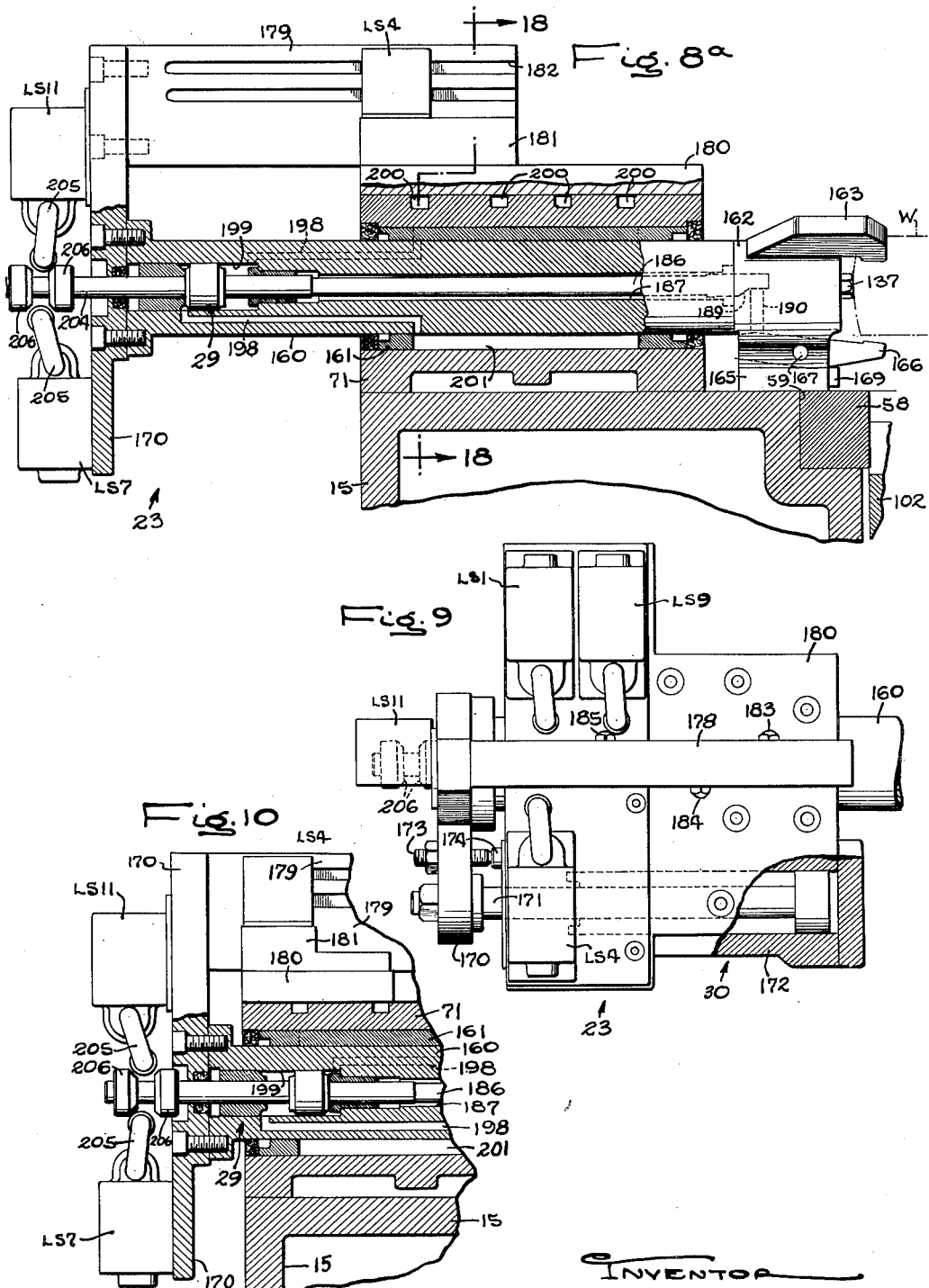

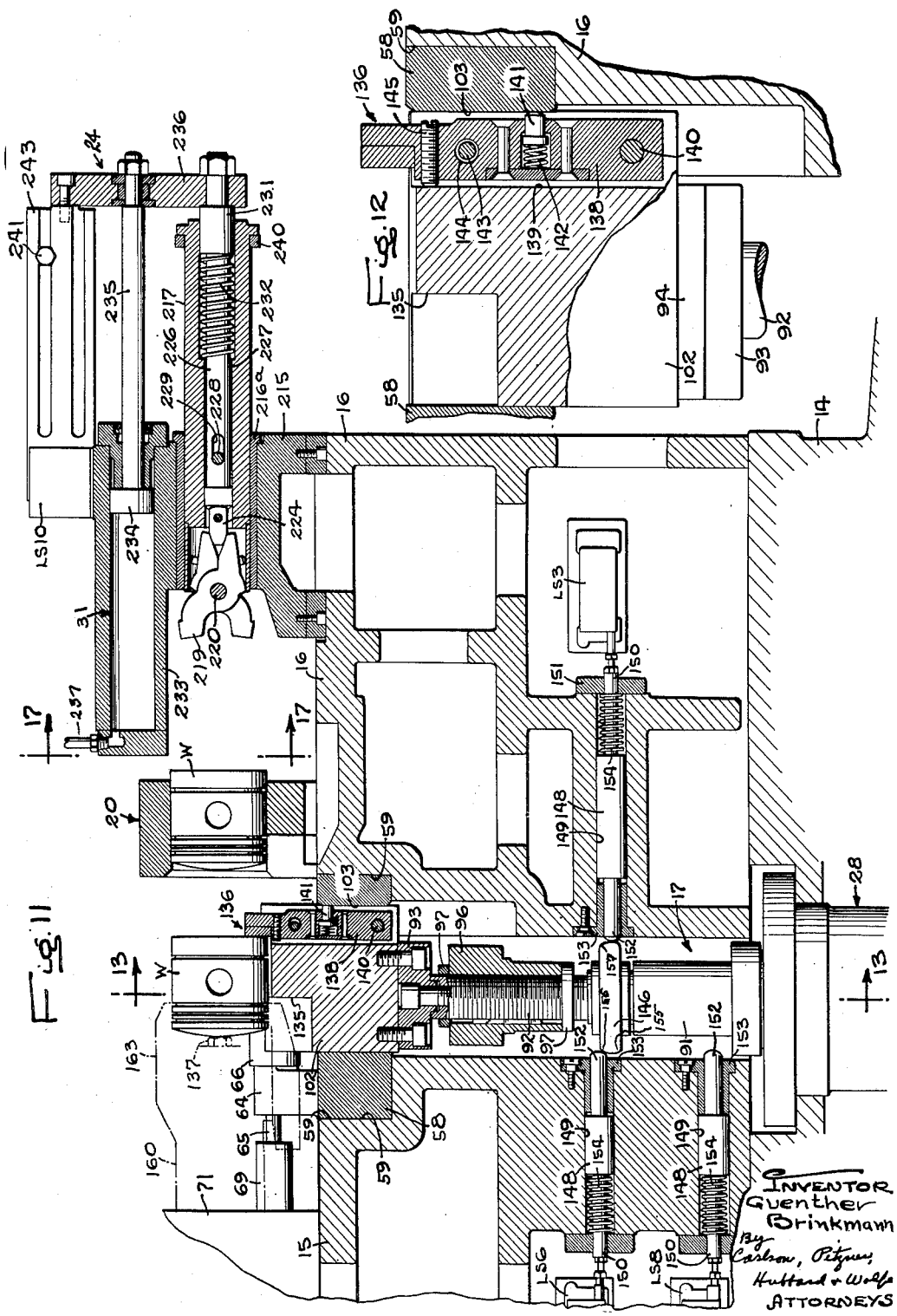

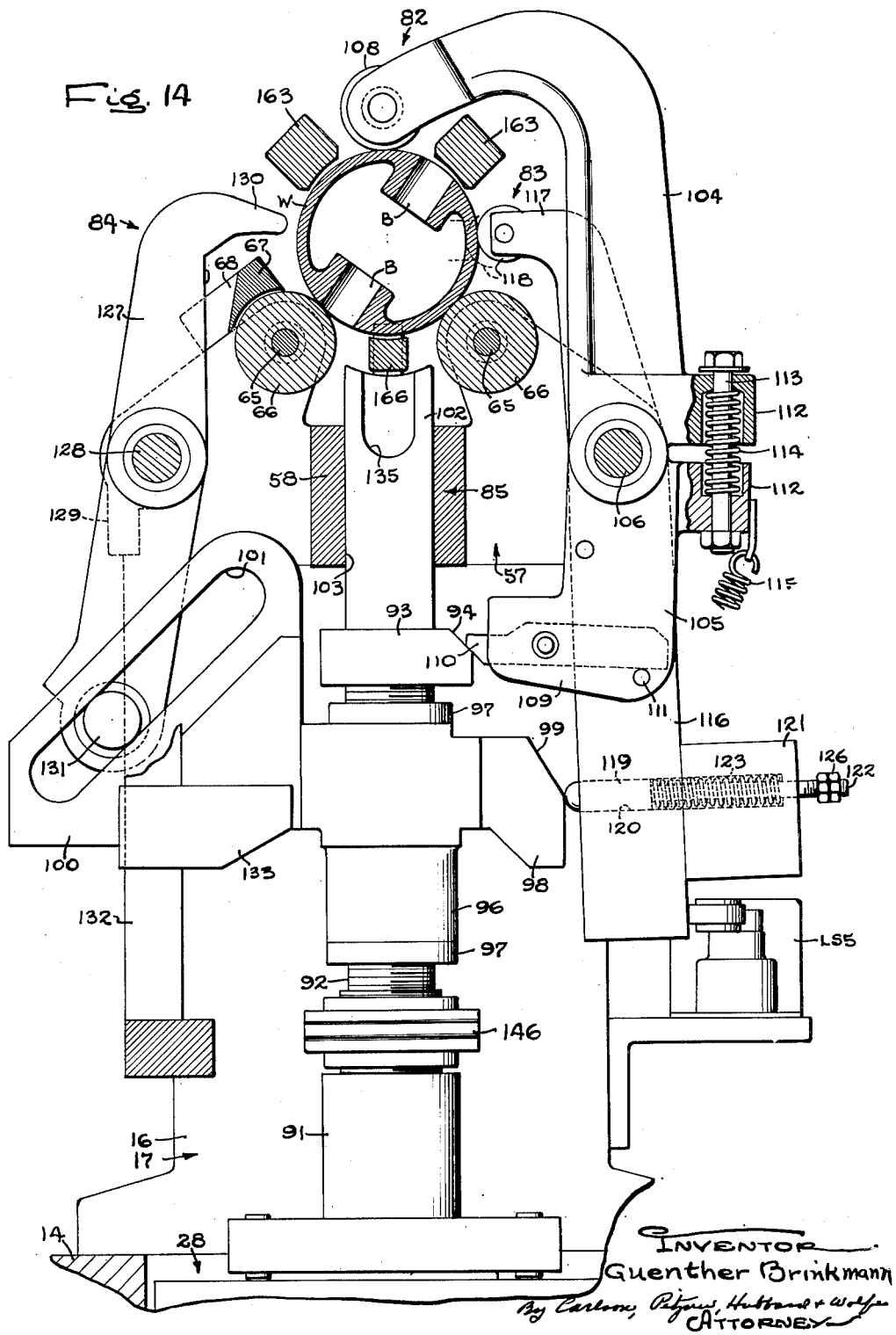

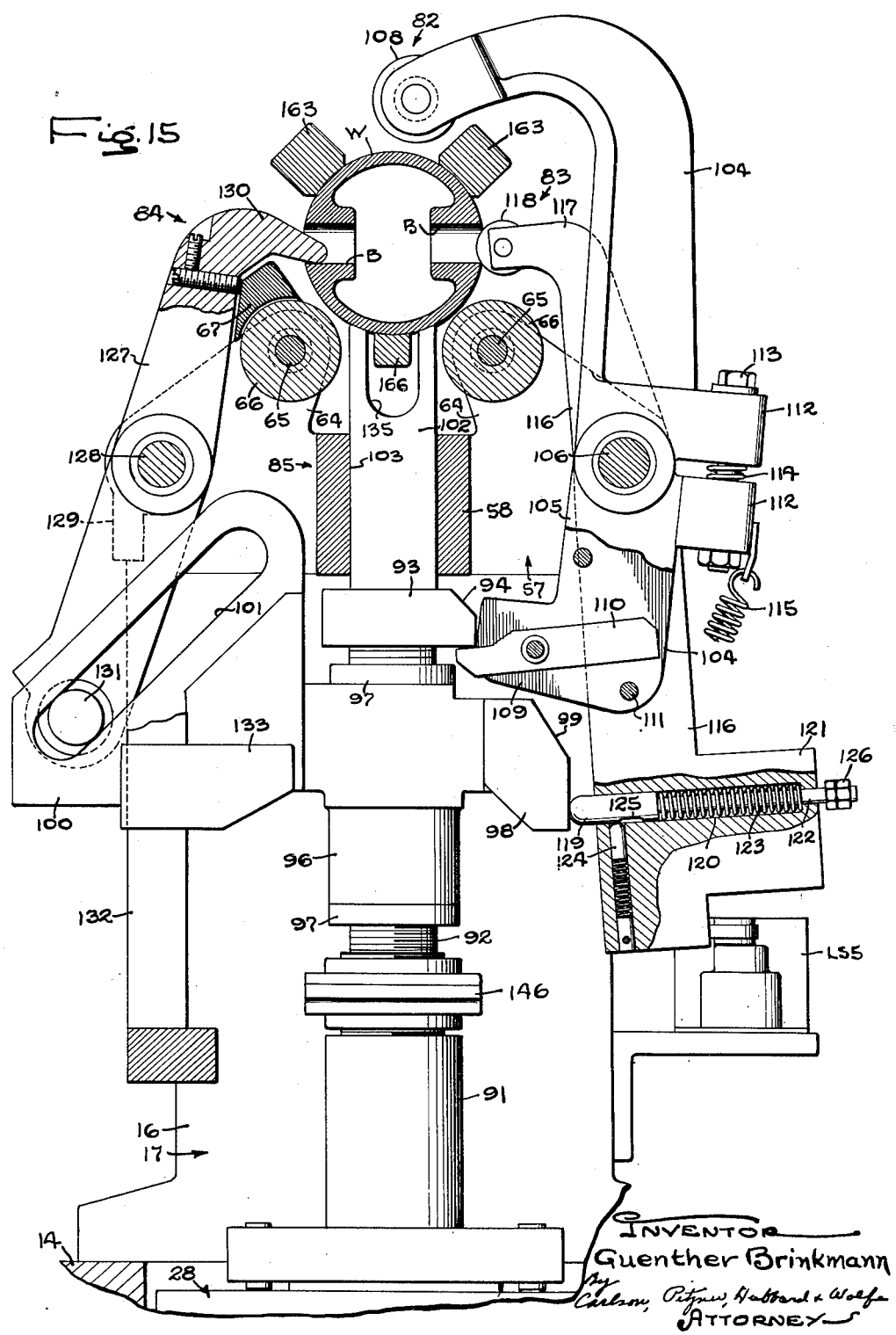

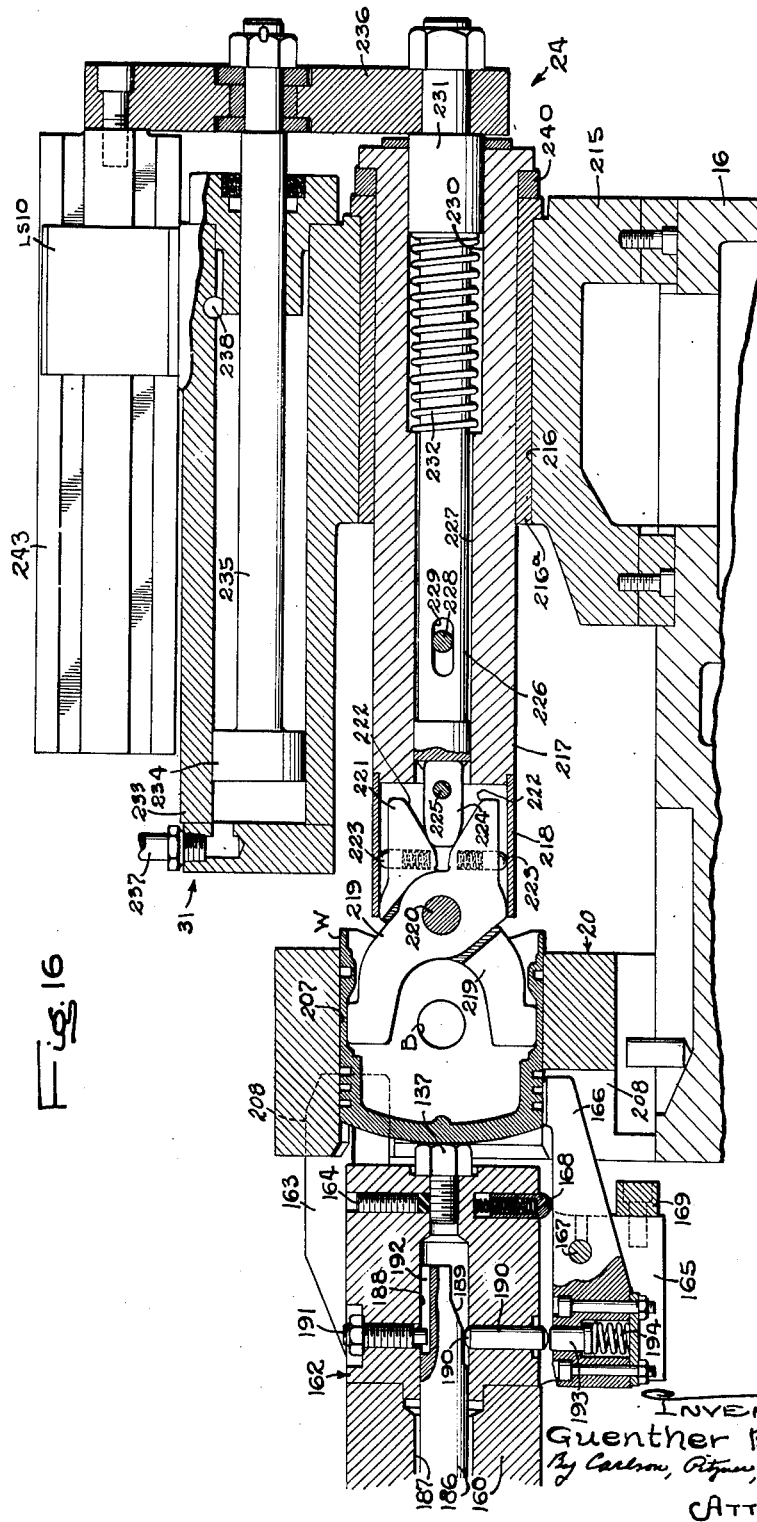

Oct. 14, 1952     G. BRINKMANN     2,613,554
BORING MACHINE
Filed June 27, 1947     18 Sheets-Sheet 14
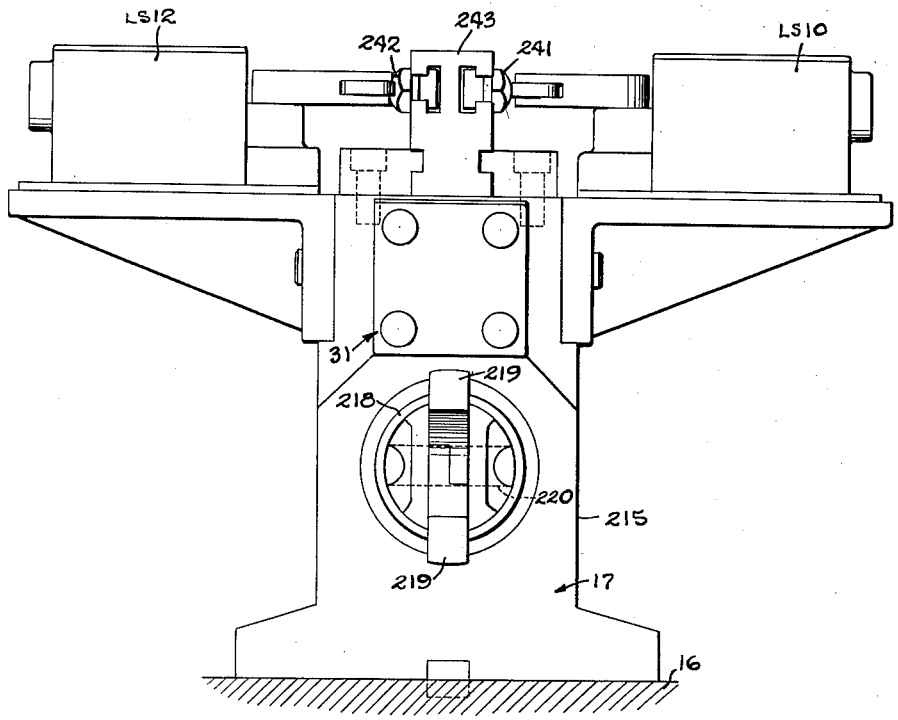
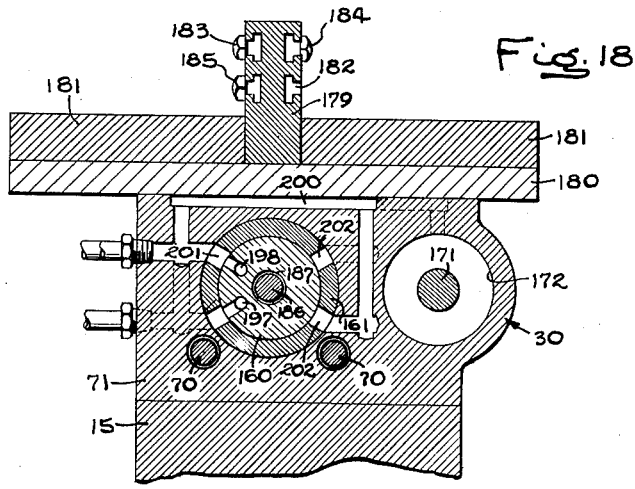
INVENTOR
Guenther Brinkmann
By Carlson, Pitzner, Hubbard & Wolfe
ATTORNEYS

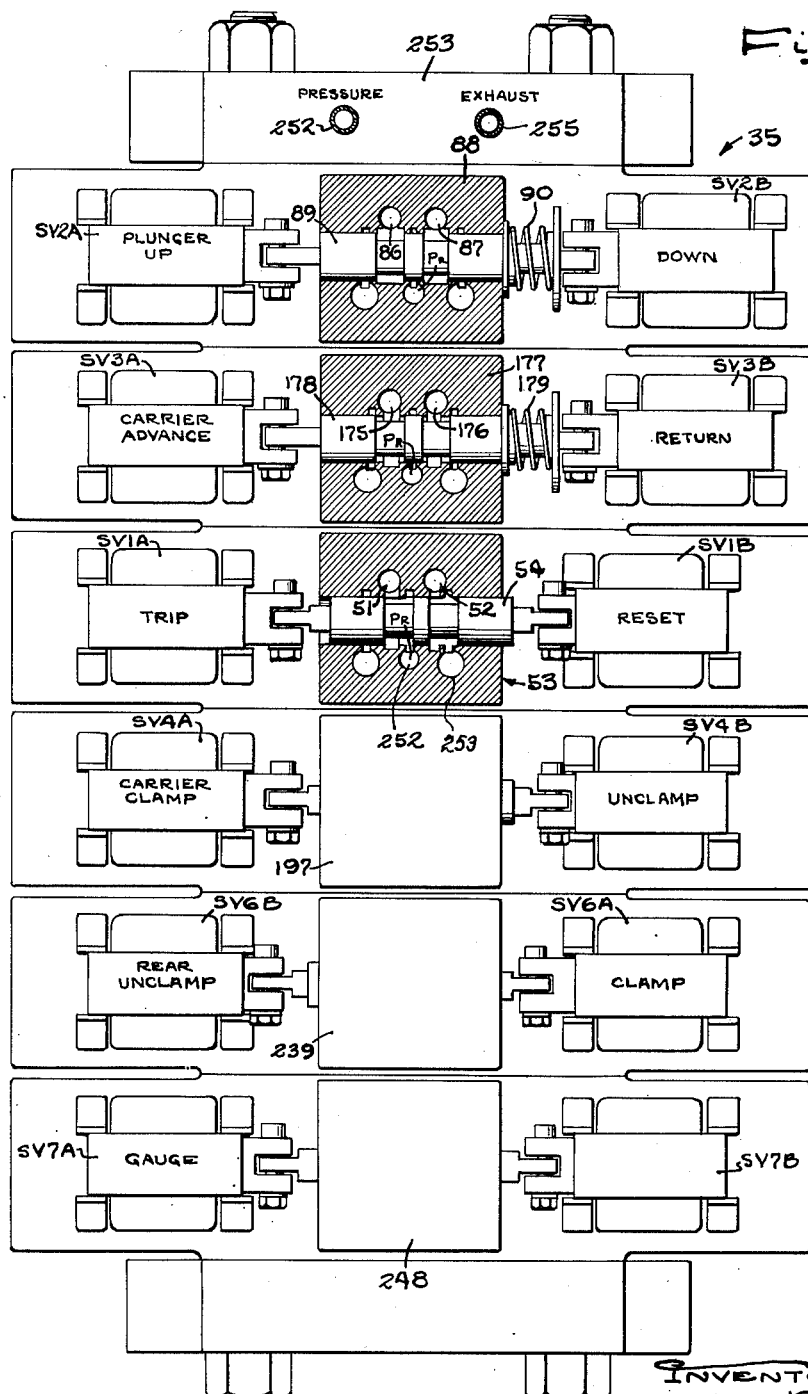

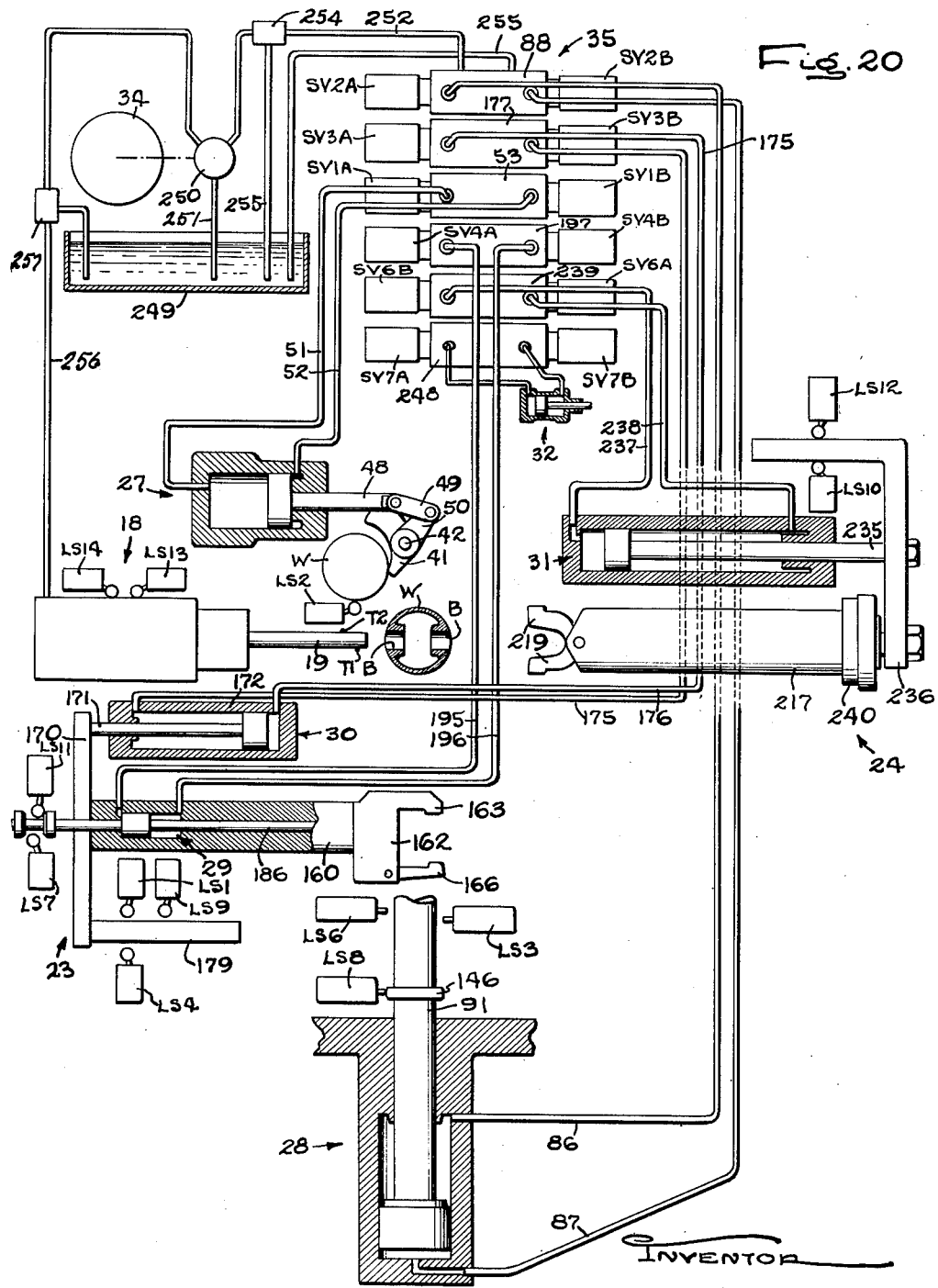

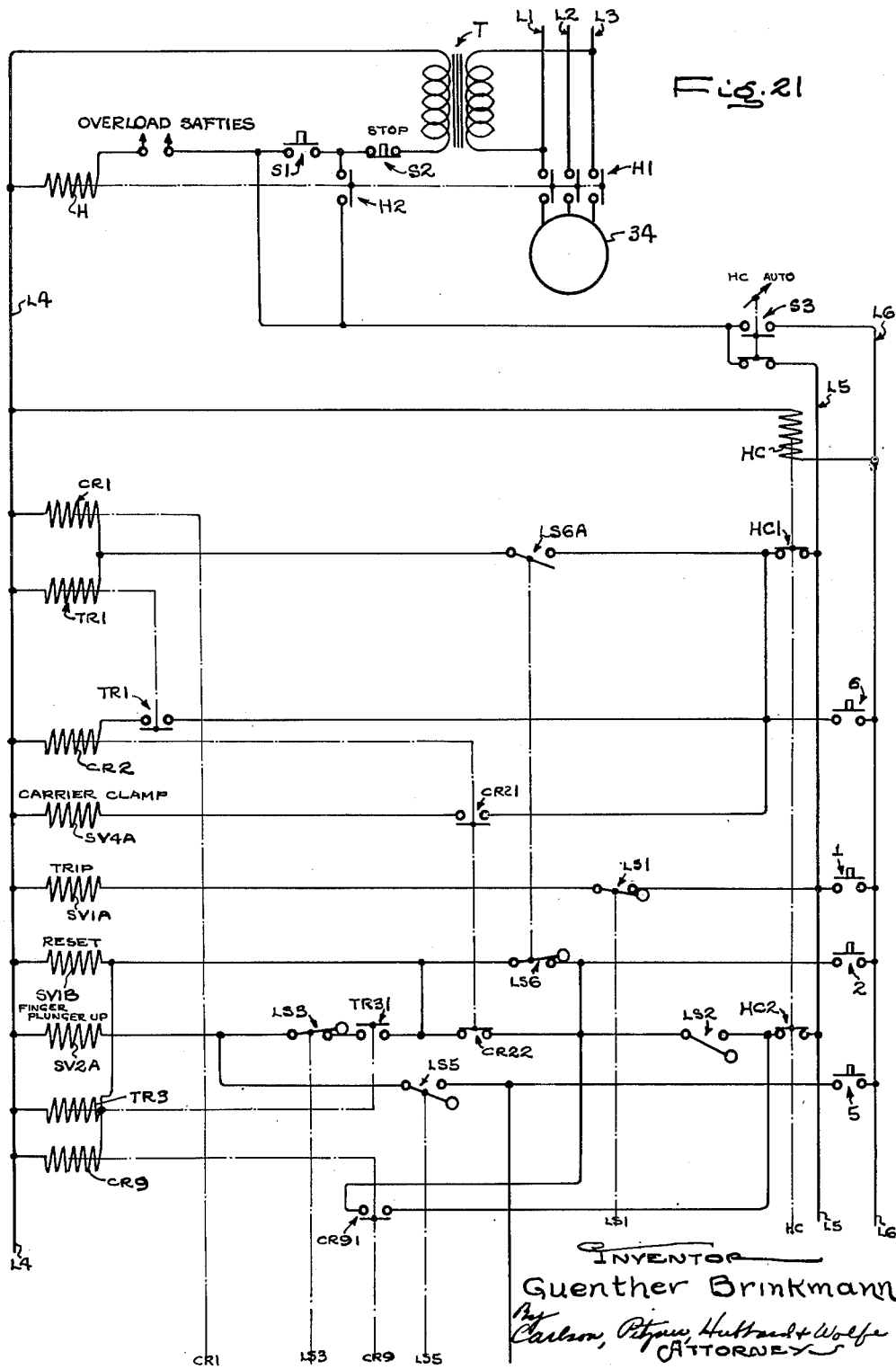

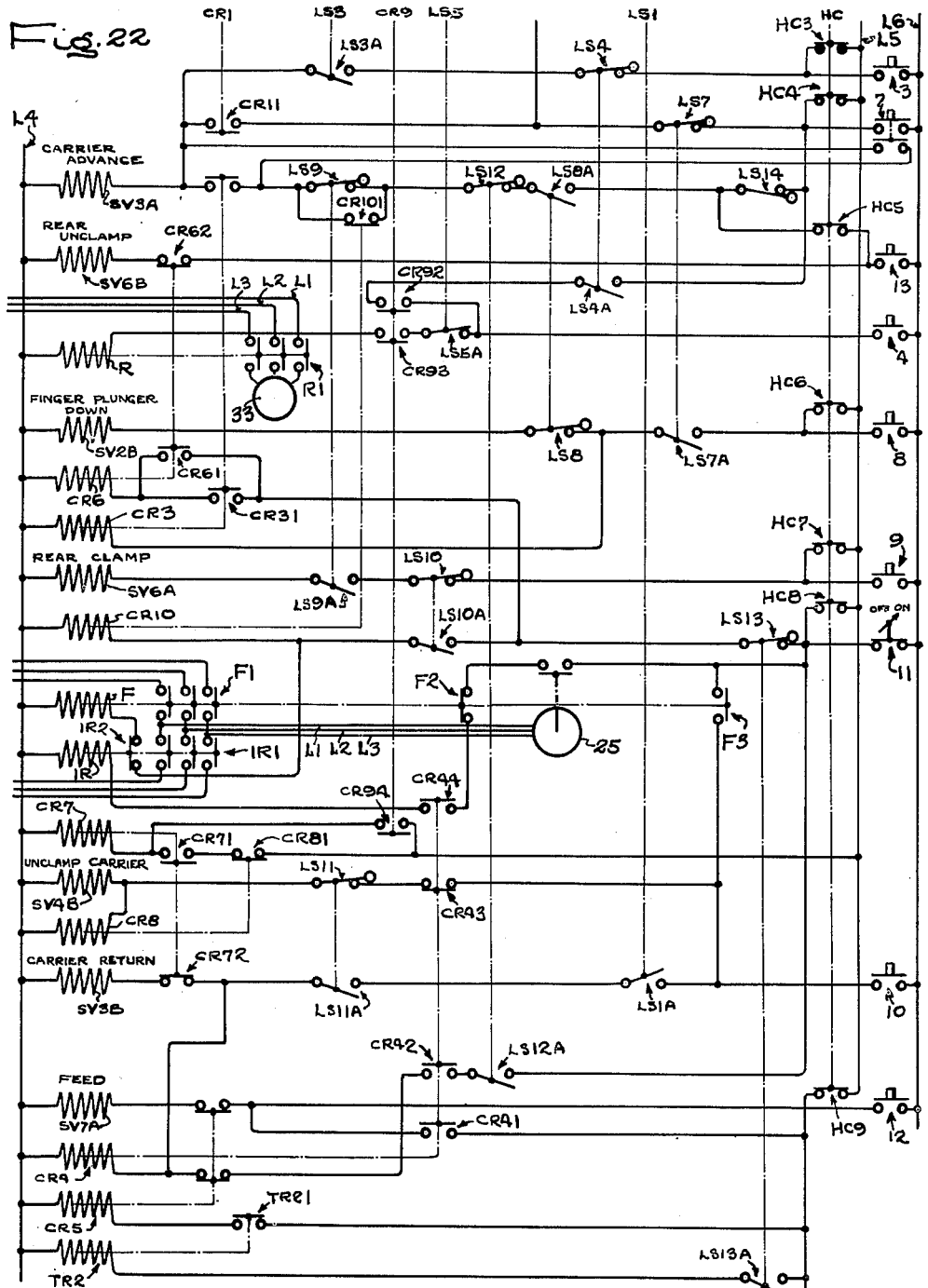

Patented Oct. 14, 1952

2,613,554

UNITED STATES PATENT OFFICE 2,613,554

BORING MACHINE

Guenther Brinkmann, Detroit, Mich., assignor to Ex-Cell-O Corporation, Detroit, Mich., a corporation of Michigan Application June 27, 1947, Serial No. 757,629

12 Claims. (Cl. 77—3)

The present invention relates to boring machines, and has particular reference to improvements in machines adapted for the boring of wrist pin bosses of automotive engine pistons.

One of the objects of the invention is to provide a wrist pin boss boring machine which is automatically self-loading and unloading, and which, more particularly, is constructed and arranged to advance a series of pistons in continuous succession from a point of entry, such as a supply chute, through the operating units of the machine to a point of exit, such as a discharge chute, and successively to locate, clamp, bore and release each piston in the course of its progress therethrough.

Another and more specific object is to provide a machine of the foregoing character for boring pistons which previously have been finished or semi-finished automatically with cored or rough-bored wrist pin holes, and each of which in the course of movement through the machine is subjected to substantially the following automatic sequence of operations:

1. Released singly from the supply chute.
2. Peripherally gripped for rotary adjustment.
3. Shifted axially into a predetermined position for preliminary location.
4. Rotated and shifted transaxially to locate the common axis of the wrist pin holes accurately in parallelism with the axis of a boring tool in a common plane.
5. Clamped radially on a carrier and shifted axially therewith into a work chuck or fixture to locate the axis of the wrist pin holes in alignment with the axis of the boring tool.
6. Clamped in located position within the work fixture.
7. Bored through the wrist pin holes by axial translation of the rotating boring tool in a selective program of rapid approach and alternating first and second feed movements to rough and finish bore first one hole and then the other.
8. Preferably gauged for correct size of the bored holes.
9. Unclamped from the work fixture, and then displaced therefrom into the discharge chute by insertion of the next piston.

Further objects reside in the provision of novel features embodied in the various operating units of the machine, such as the work locating means, and the various work clamping means, and in the combined mechanical, hydraulic and electrical controls which permit selectively of full automatic cycling or hand cycling.

Other objects and advantages will become apparent as the description proceeds.

In the accompanping drawings,

Fig. 2 is a perspective left end view of the machine, with various covers removed.

Fig. 3 is a perspective view on an enlarged scale, of the front of the machine with various covers removed.

Figs. 3a to 3i inclusive are fragmentary diagrammatic views illustrating successive steps in loading, positioning and clamping a piston preparatory to the boring operation.

Fig. 3j is a sectional view showing the relation of the piston and the boring tool after the first boss has been bored.

Fig. 4 is a fragmentary view on an enlarged scale of the left end of the machine, and illustrating the drive means for rotating the piston in the radial locating operation, and the carrier for translating the located piston axially to the work fixture.

Fig. 5 is a fragmentary horizontal sectional view taken substantially along line 5—5 of Fig. 4.

Fig. 6 is a fragmentary sectional view of the work supply mechanism for delivering the pistons one by one to the locating mechanism in successive machine cycles.

Fig. 7 is a fragmentary right-hand sectional view of the supply mechanism illustrated in Fig. 6.

Fig. 8 is a fragmentary sectional detail view taken substantially along line 8—8 of Fig. 7.

Fig. 8a is a fragmentary vertical sectional view of the work carrier and initial clamp.

Fig. 9 is a fragmentary view, partially in section, of the control associated with the work carrier.

Fig. 10 is a view similar to Fig. 8a, but illustrating the initial work clamp in a different position of operation.

Fig. 11 is a fragmentary longitudinal vertical sectional view through the machine, and illustrating the locating actuator and the final work clamp in retracted position.

Fig. 12 is a fragmentary detail view of a retractable stop forming part of the preliminary work locating means.

Figure 13:
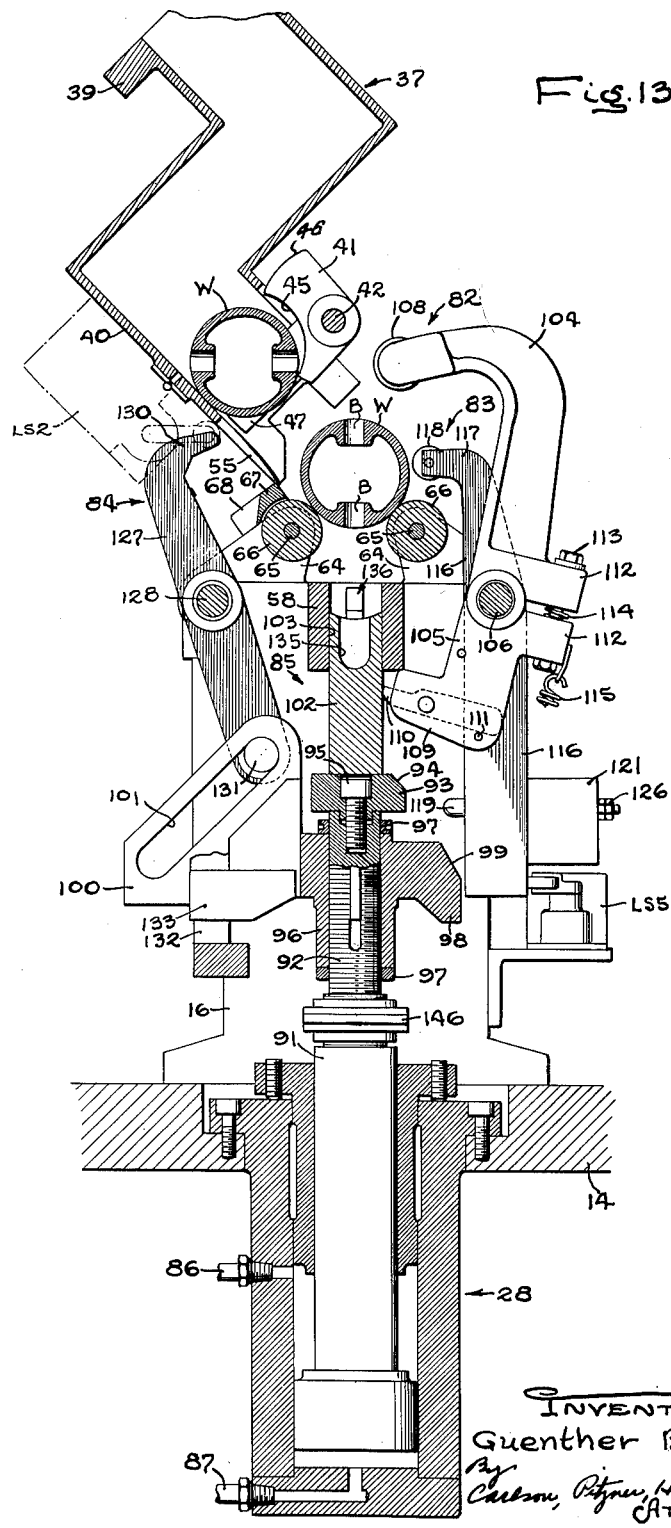

Fig. 13 is a fragmentary transverse vertical sectional view of the work locating means and illustrating the initial position of operation, the view being taken substantially along line 13—13 of Fig. 11.

Figs. 14 and 15 are fragmentary views, similar to Fig. 13 on a somewhat larger scale, and illustrating the work locating means respectively in the second and third positions of operation.

Fig. 16 is a fragmentary vertical sectional view, on an enlarged scale, showing the final work clamp in operative position.

Fig. 17 is a fragmentary end elevational view taken along line 17—17 of Fig. 11 of the final work clamp and controls associated therewith.

Fig. 18 is a fragmentary sectional view taken substantially along line 18—18 of Fig. 8a, including also the means for directing the hydraulic fluid to the clamp actuator.

Fig. 19 is a fragmentary plan view of the control valve assembly for the machine, certain of said valves being shown in axial section.

Fig. 20 is a diagrammatic representation of the hydraulic operating circuits for the machine.

Figs. 21 and 22 are a diagrammatic representation of the electrical control circuits for the machine.

Figure 1:
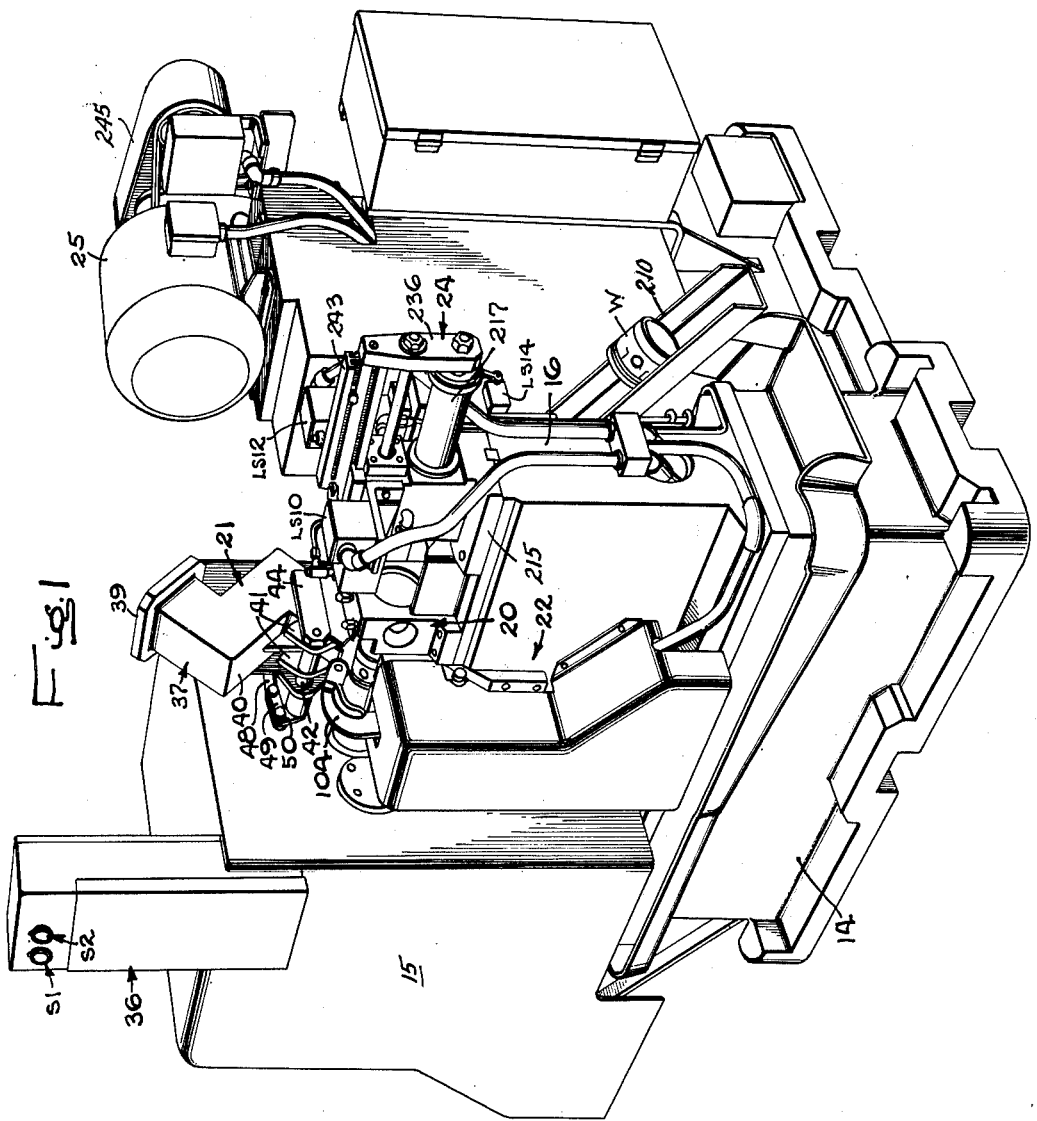
Figure 1 is a perspective view, from the front and right end, of a piston wrist pin boss boring machine embodying the features of the present invention.

Referring now to the drawings and particularly to Figs. 1, 2 and 3, the machine, constituting the exemplary embodiment of the invention, has a composite frame structure comprising a main bed 14 adapted to be supported on a suitable foundation, a plurality of base sections 15 and 16 superimposed on the bed and separated at the front thereof to define an intermediate space 17 therebetween, and a plurality of sub-base sections and brackets as hereinafter defined mounted on the base sections for supporting various operating units or instrumentalities. These units include a tool head 18 mounted on the rear end of the base section 16 and having a rotary tool spindle 19 translatable axially toward and from the front of the machine; a work chuck or fixture 20 mounted on the forward portion of the base section 16; a work supply mechanism 21 for releasing the pistons to be bored one at a time; a work locating mechanism 22 for receiving and orientating the pistons both axially and radially; a work clamp and carrier mechanism 23 for transferring each piston after orientation into the work fixture 20; and a work clamping mechanism 24 for securing the piston in boring position. Also included as part of the aforementioned units are various motors and control instrumentalities, such as a reversible electric motor 25 for driving the tool spindle 19; a series of hydraulic motors or actuators 26 to 32, preferably of the reciprocatory cylinder and piston type, for providing translatory motive force respectively to the tool spindle 19, the work supply mechanism 21, the locating mechanism 22, the initial work clamp, the work carrier 23, the final work clamp 24, and a size gauge; an electric motor 33 for driving certain elements of the locating mechanism 22; a hydraulic transmission system comprising an electric drive motor 34 and a valve panel 35; and an electric control system comprising a manual switch panel 36 and various relays, solenoids and limit switches as hereinafter described for coordinating and timing the successive steps in the machine cycle.

The pistons, which constitute the workpieces W to be bored, are either finished or semi-finished in respect of certain dimensions before being supplied to the machine so as to facilitate accurate location or alignment. Thus, the skirt and ring groove belt diameters are previously machined. The unfinished pin boss bores B (see Fig. 16) are either previously rough-bored or cored in the die casting operation.

Work supply mechanism

To permit of continuous automatic operation on an uninterrupted spaced progression of pistons W in successive machine cycles, the pistons are introduced into the work supply mechanism 21 (see Figs. 4, 6, 7 and 8). The mechanism 21 may be of any suitable character adapted to release the pistons to be bored from a supply chute or hopper 37 to the initial locating station. In the present instance, a chute 37 of rectangular cross section and zigzag construction is mounted in overhead relation to the space 17 on a bracket 38 bolted to the rear of the base section 15. The upper end of the chute 37 is provided with a coupling flange 39 by means of which it may be connected to an extension or hopper (not shown) into the inlet end of which the pistons W may be dropped manually. In the preferred form, the chute 37 is of a size and shape to receive the pistons W transversely of the axis of the spindle 19 with their crowned ends disposed toward the left and their skirt ends disposed toward the right. The zigzag construction serves to relieve the weight on the lowermost pistons which pile up in series against the outlet.

At the lower end, the chute 37 is formed with an inclined outlet section 40 extending at a downward and forward angle toward the work receiving station in the machine proper. The open end of the section 40 is normally closed by a combination trip gate and escapement which when closed serves to hold the pistons in the chute 37, and which is operable periodically each time to release the lowermost piston. In the preferred form, the gate comprises two trip levers 41 mounted in axially spaced relation on a transverse rockshaft 42 for swinging movement alternately into closed and opened position. The shaft 42 is suitably journaled in a bearing lug 43 on an upstanding supporting bracket, and a spaced lug 44 on the opposite side of the chute 37. Each of the levers 41 is formed with an arcuate cavity 45 adapted to pocket the lowermost piston W when the gate is closed (see Fig. 6), and on one end with a convex surface 46 adapted to intercept and retain the next piston as the gate is opened (see Fig. 8). Thus, one end of each lever constitutes a trip arm for normally holding and when tripped for releasing the lowermost piston, and the other end constitutes an escapement arm for intercepting the next piston as the lower piston is being released and subsequently dropping this piston into the lowermost position. A depending guide strip 47 on the opposite side of the chute outlet serves to restrain the piston W axially as it is dropped from the gate.

Any suitable means may be provided for oscillating the shaft 42 as required to release the pistons one by one for successive machine cycles. In the present instance, this means comprises the hydraulic actuator 27 which is mounted on the bracket 38, and which has a piston rod 48 connected through a link 49 to a crank arm 50 on one end of the rockshaft 42. The hydraulic actuator 27 (see Figs. 19 and 20) is connected at opposite ends through fluid supply and exhaust lines 51 and 52 leading to a reciprocatory direction valve 53 on the valve panel 35. Opposite ends of the valve plunger 54 are connected for reverse operation respectively to a trip solenoid SV1A and a reset solenoid SV1B. When the solenoid SV1A is energized at the start of the machine cycle, the valve 53 will be adjusted to supply hydraulic pressure fluid from a suitable source to the line 52, and to exhaust fluid from the line 51, so as to effect operation of the actuator 27 in a direction to trip the levers 41, thereby releasing a piston W to the initial locating station. Upon energization of the solenoid SV1B, the operation is reversed to close the gate 41 and condition the next piston for release.

The inclined outlet section 40 of the chute is provided with a hinged bottom plate 55. A limit switch LS2 is supported on the underside of this section, and has an actuating roller 56 engaging the underside of the plate 55, and operable thereby each time a piston W is delivered from the chute.

Work locating mechanism

The work locating mechanism 22 comprises a cage structure (see Figs. 4, 5, 11, 13 and 14) located below the chute 37 and into which each piston is dropped when released by the gate 41. The cage structure comprises a bracket 57 having a central generally rectangular base plate 58 seated at opposite ends in depressed recesses 59 (Fig. 7) in the adjacent ends of the base sections 15 and 16 and spanning or bridging the intermediate space 17 therebetween. At the front and rear, the bracket 57 is formed with spaced parallel depending legs 60 (Fig. 4) suitably secured respectively to the base sections 15 and 16. A cross member 61 defining the front side of the cage extends between the upper ends of the front legs, and is interrupted to provide a transverse slot 62 between opposite end portions thereof. The inner or rear face of the cross member 61 (Fig. 5) is suitably lined with a plate or insert 63 of relatively soft material, such as plastic or the like, so as to avoid marring the piston W as it is dropped into position. The front and rear portions of the bracket 57 are formed with upwardly projecting bearing lugs 64 in which are journaled two parallel shafts 65 located above and extending along opposite sides of the base plate 58. Two lower rollers 66 extending substantially the full length of the cage are fixed on the shafts 65, and are spaced transaxially to receive and support each piston W as it is delivered from the supply mechanism 21. Preferably, the rollers 66 are spaced to contact the piston along longitudinal elements of the cylindrical surface approximately 90° apart. Bridging the rear bearing lugs 64 and extending along the top of the rear roller 66 is a cross member 67 which is formed with a notch 68 in one side substantially in line with the slot 62 in the front cross member 61.

The rollers 66 are adapted for connection to a suitable rotary drive so as to rotate the piston W during the locating operation for radial alignment. To this end, the roller shafts 65 are connected through couplings 69 to aligned drive shafts 70 journaled in and extending through a pedestal 71 on the base section 15. The outer ends of the shafts 70 are connected through worm wheels 72 and worms 73 to a transverse shaft 74 journaled at opposite ends in a bearing bracket 75 bolted to the outer end of the pedestal 71. One end of the shaft 74 extends into a gear housing 76 on the end of the bracket 75, and is therein connected through a worm wheel 77 and worm 78 to a shaft 79 projecting therefrom for connection to a suitable source of power. In the present instance, a pulley 80 on the shaft 79 is connected through a belt 81 to the electric drive motor 33 at the rear of the base section 15.

Associated with the cage structure are a plurality of instrumentalities for orientating the piston W radially and for locating it in axial alignment with the work fixture 20. These instrumentalities include a pressure roller assembly 82 for holding the piston W rotatably against the bottom rollers 66, a front finger assembly 83 for locating the piston in approximate radial position, a rear finger assembly 84 for locating the piston accurately in the desired radial position, and a bottom finger assembly 85 for lifting the piston from the bottom rollers after approximate radial location into axial alignment with the work fixture. All of these assemblies are mounted on the cage bracket 57, and are operated in predetermined timed sequence by the vertical hydraulic actuator 28.

The actuator 28 is mounted in suspended position in the bed 14 of the machine, and is connected at opposite ends through fluid supply and exhaust lines 86 and 87 (Figs. 19 and 20) to a reciprocatory reversing valve 88 on the valve panel 35. The valve plunger 89 is normally centered by a spring 90, and is operatively connected at opposite ends to two solenoids SV2A and SV2B. Upon excitation of the solenoid SV2A, the valve 88 will be shifted to operate the actuator 28 in an upward direction. Upon excitation of the solenoid SV2B, the actuator 28 will return to initial position. When both solenoids are de-energized, the actuator 28 will remain stationary in any position of translation. Rigid and preferably coaxial with the upper projecting end of the actuator piston rod 91 (Figs. 4 and 15) is a vertical plunger 92 carrying a series of cams for operating the various locating assemblies 82 to 84. More particularly, the plunger 92 is of stepped construction and is threaded from end to end. Secured to the upper end of the plunger 92 is a cam 93 having an inclined cam face 94 for actuating the pressure roller assembly 82. In the present instance, the cam 93 is secured to the plunger 92 by a central bolt 95. Below the cam 93, a cross head 96 is slidably splined on the upper threaded section of the plunger 92 for axial adjustment, and is secured in adjusted position between two clamp nuts 97. The cross head has a laterally projecting cam lug 98 on one side with an inclined cam face 99 for actuating the front finger assembly 83, and has a cam plate 100 on the other side with an inclined cam slot 101 for actuating the rear finger assembly 84. The bottom finger assembly 85 comprises a narrow rectangular finger or plate 102 which is rigidly secured in superimposed relation to the end of the plunger 92 for direct movement therewith, and which is vertically slidable in a slot 103 opening through the base plate 58 of the cage bracket 57 (Fig. 15). In the present instance, the finger 102 is bolted against the cam 93. The hydraulic actuator 28, and hence the operating plunger 92 with the elements 98, 100 and 102 are movable upwardly from an initial or number 1 position first into an intermediate or number 2 position to operate the assemblies 82, 83 and 84 successively, and then from the number 2 position into an upper or number 3 position to project the finger 102 upwardly between the rollers 66.

The pressure roller assembly 82 comprises two levers 104 and 105 which are rotatably mounted at their contiguous ends on a stub shaft 106 supported in and extending crosswise of bearing lugs 107 on the front depending arms 60 of the bracket 57, and which are yieldably interconnected for joint swinging movement. One lever 104 extends upwardly from the shaft 106 and is of gooseneck shape. A pressure roller 108 is mounted in the free end of this lever for movement thereby into engagement with the top periphery of the piston W as the latter rests on the locating rollers 66. The other lever 105 projects downwardly from the shaft 106 and has a transverse foot 109 supporting a pivotal dog 110 for engagement by the cam 93. The dog 110 normally rests on a stop pin 111, and is pivoted therefrom to permit downward movement of the cam 93 in the return stroke of the plunger 92. The adjacent ends of the levers 104 and 105 are formed with spaced overlapping apertured lugs 112 loosely interconnected by a bolt 113. A coiled compression spring 114, encircling the bolt 113, is interposed between the lugs 112, and tends to spread them apart to the extent permitted by the lost motion. A coiled tension spring 115, anchored at opposite ends respectively to the lower lug 112 and to the base section 15 of the machine, tends to oscillate the lever assembly in a direction to disengage the roller 108 from the piston W. As the plunger 92 is operated upwardly, the cam 93 engages the dog 110 to rock the lever assembly in a counterclockwise direction, as viewed in Fig. 13, to bring the pressure roller 108 into yieldable engagement with the piston. In the subsequent movement of the plunger 92 into the number 3 position, the cam 93 will move past the dog 110, thereby permitting the tension spring 115 to retract the pressure roller 108. On the return stroke of the plunger 92 the dog 110 will pivot to permit the cam 93 to pass.

The front finger assembly 83 comprises a vertical lever 116 supported intermediate its ends for oscillation on the shaft 106. The upper end portion of the lever 116 is formed with a laterally extending arm 117 supporting a spherical roller 118 for engagement with the periphery of the piston W. The lower end portion of the lever 116 is provided with a spring-pressed cam follower 119 disposed in the path of the cam lug 98. In the present instance, the follower 119 consists of a pin slidable in a bore 120 in a lug 121 on the lower end of the lever 116, and having a reduced stem 122 extending therefrom to the forward face. A coiled compression spring 123 is confined within the bore 120 about the stem 122 and tends to urge the pin 119 out of the bore for engagement by the cam lug 98. Also mounted in the enlargement is a spring-actuated detent 124 adapted to engage in an elongated transverse notch 125 in one side of the pin 119 to maintain the latter yieldably in extended position. Two lock nuts 126 threaded on the outer end of the stem 122 limit the extent to which the follower pin 119 can be projected. As the plunger 92 is elevated, the inclined cam face 99 on the cam lug 98 will engage the follower pin 119 to swing the lever 116 in a counterclockwise direction as viewed in Fig. 13 so as to bring the spherical roller 118 into contact with the periphery of the piston. Due to the action of the spring 123, the roller 118 will contact the piston resiliently with a predetermined pressure. As the base rollers 66 are driven to revolve the piston W, the spherical roller 118 will ultimately enter and seat in one of the wrist pin boss holes B, thereby preventing further rotation of the piston at this time, and locating the piston in approximately radial position. Upon movement of the spherical roller 118 into the wrist pin hole B, the lower end of the lever 116 is swung upwardly sufficiently to actuate a limit switch LS5 (Figs. 13, 21 and 22). This switch is mounted on the front of the base section 16.

The rear finger assembly 84 comprises a generally vertical lever 127 supported intermediate its ends on a shaft 128 journaled in bearing lugs 129 on the bracket 57. The upper end of the lever 127 has adjustably secured thereto a forwardly projecting locating finger 130 adapted to enter the rear bore B of the piston W. In the preliminary positioning of the piston by the spherical roller 118, the finger 130, although extending into the bore B, performs no locating function. A follower pin 131, rigid with the lower end of the lever 127 projects laterally therefrom into the cam slot 101. As the plunger 92 is elevated into the number 2 position, the cam plate 100 acts on the follower pin 131 to rock the lever 127 so as to move the locating finger 130 into the rear bore B. This rocking movement is continued as the plunger 92 is further elevated into the number 3 position, and as a result, the finger 130 locates the piston W accurately in the desired radial alignment, the roller 118 engaging the opposite roller in off-center relation, as shown in Fig. 15.

To constrain the cross head 96 against rotary displacement, a vertical guide bar 132 is attached to the rear of the bracket 57 and engages slidably between the cam plate 100 and a guide finger 133.

The bottom finger assembly 85 comprises the plate or finger 102 as described. The upper edge of the plate 102 is provided with an arcuate face 134 conforming to the peripheral curvature of the piston W. A notch 135 is formed in one end portion of the face 134 for clearance purposes. Upon movement of the plunger 92 from the number 2 position into the upper limit or number 3 position, the blade 102 moves into engagement with the underside of the piston and lifts the latter from the rollers 66 positively against two laterally spaced overhead clamping fingers of the carrier 23. The piston W is thereby located accurately in axial alignment with the work fixture 20, and is later clamped in this position before being shifted axially into the fixture. As previously stated, the rear locating finger 130 coacts with the bottom side of the rear piston bore B in the course of the shifting movement to effect the final radial orientation of the piston.

A clapper stop 136 is mounted in one side of the finger 102 for engaging the open end edge of the piston skirt to maintain the crowned end of the piston in engagement with a shiftable abutment 137 on the carrier for purposes of preliminary axial location. In the form shown, the clapper stop 136 comprises a lever 138 disposed in a vertical slot 139 in one side edge of the finger 102, and pivoted therein at its lower end on a pin 140. A plunger 141 is slidably guided in an intermediate portion of the lever 138 and projects therefrom under the force of a confined spring 142 for abutting engagement with the contiguous end surface of the guide slot 103 in the plate 58. Thus, the plunger 141 acts to urge the clapper stop 136 yieldably to the left as shown in Figs. 11 and 12. A pin 143 fixed in the finger 102 extends loosely through a hole 144 in the lever 138 to permit limited swinging movement of the latter about the pin 140. Extreme limit of movement of the lever 138 to the left is determined by a set screw 145 as when there is no piston in the orientating chamber. After the piston has been located and clamped, the stop 136 is retracted downwardly out of contact with the piston so that the latter can be shifted axially past the stop.

The operation of the actuator 28 is correlated with the machine cycle by means of limit switches LS3, LS6 and LS8 located within the base sections 15 and 16 and operable by a cam 146 on the plunger 92.

The switches LS3, LS6 and LS8 (Fig. 20) may be alike in construction, and hence a description of one will suffice for all. Thus, each switch is operable by a cylindrical rod 148 (Fig. 11) slidable in a bore 149 which opens to one side or other of the space 17. The outer end of the rod 148 has a stem 150 of reduced diameter which extends through a plate 151 enclosing the outer end of the bore 149, and which is operatively connected to the switch actuator. The other end of the rod 148 has an axial pin 152 which extends through an elongated bushing 153 in the inner end of the bore 149. A coiled compression spring 154 disposed about the stem 150 and seating against the plate 151 tends to urge the rod 148 inwardly into stop position against the bushing 153. In this position of the rod 148, the end of the pin 152, which is rounded, projects into the path of the cam 146.

The several pins 152 for the switches LS3, LS6, and LS8 are located in a common plane and are spaced axially of the plunger 92 as determined by the required timing of the functions controlled thereby. Thus, the cam 146 is formed at one side of the axis on the lower edge with an inclined cam face 155 adapted to actuate the stem 150 for the switch LS8 when the plunger 92 is in its lowermost or initial position, and is formed at the same side on the upper edge with an inclined cam face 156 adapted to actuate the stem for the switch LS6 when the plunger is in its uppermost position, and is formed at the opposite side of the axis on the upper edge with an inclined cam face 157 adapted to actuate the stem for the switch LS3 when the piston is in its second or intermediate position.

It will be evident that the switch LS3 is actuated on both the upward and downward movements. To facilitate adjustment, the cam 146 is secured between two clamp nuts 158 threaded on the plunger 92. A set screw 159 serves to retain the cam 146 in correct angular position.

*The work clamp and carrier mechanism*

The clamp and carrier mechanism 23 (see Figs. 4, 8a, 9, 10, 11, 16, 18 and 19) is operable, in cooperation with the clapper stop 136, to locate the piston W axially for radial and transaxial orientation, and then to clamp and to shift the located piston axially into the work fixture 20. In its preferred form the carrier 23 (Figs. 8a, 9, 10 and 16) comprises a ram 160 extending slidably through a sleeve 161 in the pedestal 71 on the base section 15. Fixed on the inner end of the ram 160 is a clamp head 162 having two peripherally spaced rigid clamping fingers 163 (Fig. 16) projecting therefrom for engaging the top portion of the piston W when the latter is elevated by the blade 102 as previously described. The locating abutment 131, in the form of a headed bolt, is threaded axially into the end of the head 162, and is locked in position by a rubber-cushioned set screw 164. Spaced guide blocks 165 project downwardly from the head 162 into bearing engagement with the top surface of the base section 15 and the plate 58 to provide a rigid outboard support. A movable clamping finger 166 is mounted between the blocks 165 for radial pivotal movement about a pin 167, and projects endwise therefrom in parallel opposed relation to the fingers 163. Normally, the finger 166 is urged by a spring-pressed plunger 168 into open or released position against a limit stop 169.

The carrier 23 is shiftable axially from an initial or number 1 position first into an intermediate or number 2 position to locate the piston W axially on the cage rollers 66 and the fingers 163 and 166 about the dome end of the piston, and then, after the piston has been orientated radially and transaxially and has been clamped between the fingers, from the intermediate position into the final or number 3 position to transfer the piston to the work fixture 20.

Any suitable power means may be provided for shifting the carrier ram 160, and in the present instance the outer end is connected to a crosshead 170 in turn connected to the piston rod 171 of the reciprocable hydraulic actuator 30. The cylinder 172 of the actuator 30 is formed in the front side of the pedestal 71 in parallel relation to the ram 160. A set screw 173 adjustably threaded through the crosshead 170 for end abutment with a button 174 serves to limit the forward position of the carrier 23. Opposite ends of the actuator 30 are connected through fluid lines 175 and 176 (see Fig. 20) to a reciprocable direction valve 177 on the panel 35. The valve plunger 178 is normally centered and opposite ends thereof are operatively connected respectively to solenoids SV3A and SV3B. Upon energization of the solenoid SV3A, the actuator 30 will operate in a forward direction. Upon energization of the solenoid SV3B, the actuator 30 will operate in a reverse direction to return the carrier 23 to initial position. When both solenoids are deenergized, the actuator 30 will be locked in position of translation.

The movements of the carrier 23 are correlated in the machine cycle by limit switches LS1, LS4 and LS9 (see Figs. 8a and 9) mounted on the top of the pedestal 71 and operable by dogs on a dog bar 179 connected to the crosshead 170. More particularly, a top plate 180 extends across and is bolted to the pedestal 71. Two spaced parallel guide plates 181 are secured on the top plate 180, and support the limit switches LS1, LS4 and LS9. The free end of the dog bar 179 is slidably guided on the plate 180 between the plates 181, and is formed in opposite sides with longitudinal T-slots 182 for adjustably anchoring a plurality of switch actuating dogs 183, 184 and 185 located at two elevations respectively to actuate the switches LS1, LS4 and LS9. Thus, in the retracted initial position of the carrier 23, the dog 183 will actuate the switch LS1. At the number 2 position of the carrier 23, the dog 184 will actuate the switch LS4, and at the number 3 or fully advanced position, the dog 185 will actuate the switch LS9.

The carrier clamp is operated automatically to secure the orientated piston W between the fingers 163 and 166 preparatory to shifting movement of the carrier 23 from the number 2 position into the number 3 position. The clamp actuating mechanism comprises a cam rod 186 extending axially through a bore 187 in the ram 160. The forward end of the rod 186 has a sliding fit in a bore 188 in the head 162, and is therein formed in one side with a stepped cam surface 189. A free follower pin 190 extending radially through the wall of the bore 188, coacts at its inner end with the cam surface 189 and at its outer end with the pivotal clamping finger 166. A spline pin 191 is threaded into the bore 188 to engage in a spline groove 192 in the rod 186 to constrain the latter against rotation. To provide a yieldable pressure grip, the cam follower pin 190 engages a plunger 193 located in the heel end of the finger 166 and urged outwardly by a confined spring 194.

The cam rod 186 is shiftable axially by the hydraulic actuator 29 which is built into the outer end of the ram 160, and which has fluid lines 195 and 196 leading to a reciprocable direction valve 197 on the panel 35. This valve is operable by a solenoid SV4A to shift the rod 186 to the right into clamping position, and by a solenoid SV4B to shift the rod to the left into release position. To establish fluid connections with the actuators 29 and 30, the pipe lines 175, 176, 195 and 196 leading from the valves 177 and 197 are connected to open respectively to a series of cross passages 200 formed in the top of the pedestal 71 and closed by the top plate 180. Two of these passages open to opposite ends of the cylinder 172. The remaining two passages 200 are connected with longitudinal passages 201 formed in the sleeve 161. The passages 201 are always in communication respectively with longitudinal passages 198 opening to opposite ends of the cylinder 199. Consequently, the flow connections to the actuator 29 are always established regardless of the axial position of the ram 160. In order to secure a pressure balanced condition on the ram 160, two additional longitudinal passages 202 are formed in the sleeve 161 opposite the passages 201 and are connected to two of the cross passages 200.

The operation of the clamping mechanism is correlated with the machine cycle by limit switches LS7 and LS11 (Figs. 2, 4 and 20) mounted on the crosshead 170, and operable by a rod 204 extending outwardly from the piston of the actuator 29. These switches have actuating levers 205 extending between axially spaced collars 206 on the rod 204. The switch LS7 is actuated when the clamp is applied, and the switch LS11 is actuated when the clamp is released.

*The work fixture*

The work fixture 20 (Figs. 3, 11 and 16) may be of any suitable character adapted to receive and support the piston W in boring position. In the present instance, the fixture comprises a block mounted on the base section 16, and having a bore 207 opening therethrough in axial alignment with the carrier 23 and adapted to receive the piston W with a snug sliding fit. Suitable clearance notches 208 are formed in one side of the fixture to receive the ends of the clamping fingers 163 and 166. Openings 209 are formed in the block at diametrically opposite sides of the bore 207 for entry of the boring spindle 19.

In its number 3 position, the carrier 23 locates the piston W axially in the bore 207 to position the transverse axis of the wrist pin holes B in accurate alignment with the axis of the tool spindle 19. As each piston is adavanced into the work fixture 20, the previously bored piston is ejected therefrom and dropped onto a discharge chute 210.

*Final work clamping mechanism*

Upon location of each piston W in boring position within the work fixture 20, it is securely clamped therein, and thereupon the clamping fingers 163 and 166 may be disengaged and the carrier 23 may be withdrawn into initial position for the next cycle.

The final work clamping mechanism 24 (Figs. 1, 3 and 11) comprises a pedestal 215 bolted to the top of the base section 16, and formed with a bore 216 in axial alignment with the bore 207 in the work fixture 20. A liner sleeve 216a is secured in the bore 216, and a tubular member or ram 217 is slidably disposed therein. Secured concentrically to the forward end of the ram 217 is a thin-walled sleeve 218 for supporting two outwardly projecting tong clamping members or fingers 219 for pivotal spreading movement on a transverse pin 220. The members 219 constitute an internal scissors clamp, and are arranged, when located within the skirt of the piston, to straddle the piston pin bores B.

The clamping members 219 are provided with heels 221 extending into the sleeve 218, and formed with oppositely inclined cam faces 222 on their adjacent sides. Normally spring-pressed plungers 223 mounted within the heels 221 coact with the inner surface of the sleeve 218 to contract the members 219. To provide means for applying the clamp, a wedge pin 224 is disposed between the heels 221 and is movable axially to spread the latter, and thereby expand the fingers 219 into clamping engagement with the interior of the piston skirt. The wedge pin 224 is pivotally connected by a pin 225, in order to secure an equalized clamping action, to the forward end of an actuating rod 226 extending slidably through a bore 227 in the ram 217. A cross pin 228 extending through a slot 229 in the rod 226 serves to constrain the latter against rotation. The outer end of the ram 217 is formed with a counterbore 230, and an enlargement 231 on the rod 226 is slidable therein. A coiled compression spring 232 seated in the counterbore 230 acts on the enlargement 231 normally to retract the wedge pin 224 so as to release the clamp.

The clamping mechanism is bodily translatable into and out of clamping position and operable to apply or release the clamp by the hydraulic actuator 31 on the pedestal 215. In the present instance, the actuator 31 comprises a cylinder 233 integral with the pedestal 215 and extending in parallel relation to the ram 217. A piston 234 reciprocable in the cylinder 233 has a piston rod 235 connected at its outer end to a crosshead 236 in turn connected to the outer end of the rod 226. The cylinder 233 is connected at opposite ends to fluid lines 237 and 238 leading to a reciprocatory direction valve 239 on the panel 35, and operable to effect advance and retract movements of the actuator 31 by energization respectively of solenoids SV6A and SV6B.

After the piston W to be bored has been advanced into the work fixture 20, the hydraulic actuator 31 is operated to advance the ram 217 and rod 226 bodily until the internal clamp head is located within the piston skirt. Upon engagement of a stop ring 240 on the outer end of the ram 217 with the flanged outer end of the liner sleeve 216a, continued forward operation of the hydraulic actuator 31 will shift the rod 226 against the force of the spring 232 to spread the clamping members 219 into engagement with the inner periphery of the piston skirt, and thereby expand the latter into tightly clamped engagement with the encircling surface of the bore 207 of the work fixture 20.

Operation of the final clamping mechanism 24 is correlated in the machine cycle by limit switches LS10 and LS12 (see Fig. 17) operable by dogs 241 and 242 on a longitudinal dog bar 243 connected at one end to the crosshead 236. The switches are mounted on the pedestal 215 at opposite sides of the bar 243.

Tool head

The tool head 18 (Figs. 2 and 3) may be of any suitable type operable to translate the boring spindle 19 axially through a predetermined program in a forward boring stroke and an idle return stroke. In the present instance, the tool head is of the self-contained type, and is mounted on the rear portion of the base section 16 with the tool spindle axis in accurate alignment with the side holes 209 in the work fixture 20. The motor 25 for driving the spindle 19 is mounted on a slideway 244 for the spindle housing, and is connected thereto by a belt 245. Details of the tool head per se do not form part of the present invention, and hence are not fully disclosed. It is believed sufficient to say that the spindle 19 is slidably advanced by the hydraulic actuator 26 through a program comprising a rapid approach movement, then a fast feed and slow feed for rough and finish boring the first piston hole B and then a fast feed and slow feed for boring the second piston hole B. At the end of the forward stroke, the hydraulic pressure is relieved, and the spindle 19 is returned by spring pressure into initial position. The program of movements is controlled by dogs 246 on the side of the spindle housing and coacting with a control valve 247 in the slideway 244.

Preferably the spindle 19 has two diametrically opposed single point rough boring tools T1 and a trailing finish boring tool T2.

Movements of the tool spindle 19 are correlated in the machine cycle by limit switches LS13 and LS14 (Fig. 22).

At the end of the boring cycle the dimensions of the holes B may be automatically checked by a gauge (not shown) operable by the hydraulic actuator 32 under the control of a reciprocatory direction valve 248 shiftable in opposite directions by solenoids SV7A and SV7B.

Hydraulic system

The hydraulic system includes the various hydraulic actuators and reversing valves already described, and a suitable source of hydraulic pressure fluid. In the present instance the pressure fluid source comprises a reservoir or tank 249 mounted at the rear of the machine bed 14, and a pump 250 driven by the electric motor 34, both the pump and the motor being mounted on the top of the reservoir. The pump 250 has a suction line 251 taking fluid from the reservoir 249, and a pressure line 252 leading to the manifold 253 on the valve panel 35 for connection to the pressure inlet ports of the various valves. A relief valve 254 interposed in the pressure line 252 serves to determine the working pressure. The exhaust ports of the various valves are connected through the manifold 253 to an exhaust line 255 leading back to the reservoir.

A branch pressure line 256 including a relief valve 257 opens from the pump 250 to the tool head 18 for connection by the valve 247 to the hydraulic actuator 26 to advance the tool spindle 19 through the forward stroke of the boring cycle.

Electrical control and operation

The electrical control circuits for the machine are illustrated diagrammatically in Figs. 21 and 22 which should be viewed in end to end relation.

Electrical energy is available from a suitable source through a main supply switch (not shown) to primary circuits comprising main lines L1, L2 and L3 for serving the hydraulic drive motor 34, the tool spindle motor 25 and the roller drive motor 33. A transformer T, connected across the lines L1 and L3, makes available electrical enery at reduced voltage to secondary circuits comprising lines L4, L5 and L6.

To start the hydraulic drive motor 34, which operates continuously, and to condition the circuits for cycling of the machine, manual start switch S1 is momentarily closed. This completes a circuit through stop switch S2 and overload safety contacts, for relay coil H, and also for relay coil HC when set for hand cycling. Coil H closes motor contacts H1 to connect the motor 34 to the lines L1, L2 and L3, and sealing contacts H2 to maintain the circuit and to connect either line L5 or line L6 to the transformer T.

The various control instrumentalities for the electric motors 25 and 33 and the hydraulic actuators 26 to 32 are adapted to be connected across secondary lines L4 and L5 for automatic cycling, or lines L4 and L6 for hand cycling, depending on the setting of manual selector switch S3. If the switch S3 is set for hand cycling, the relay coil HC, which is connected across the lines L4 and L6, will be energized to open a series of contacts HC1 to HC9 in the parallel cross circuits between the lines L4 and L5. If the switch S3 is set, as shown, for automatic cycling, the relay coil HC will not be energized, and hence the contacts HC1 to HC9 will remain closed.

Assuming that the switch S3 has been set for automatic cycling, and that the various machine elements are in starting position, closing of the start switch S1 to connect the line L5 to power serves to complete a circuit through limit switch LS1 for the valve solenoid SV1A and thereby to effect operation of the hydraulic actuator 27. Thereupon, a piston is released from the chute 21 and drops onto the rollers 66 (see Fig. 3a).

In passing from the outlet section 40 of the supply chute 21, the piston momentarily closes limit switch LS2 to complete a circuit through contacts HC2 and limit switch LS6 for relay coils TR3 and CR9. Relay coil CR9 closes sealing contacts CR91, and contacts CR92, CR93 and CR94. Closing of contacts CR92 and CR93 prepares a circuit for relay coil R. Relay TR3 closes contacts TR31 to complete a circuit through limit switch LS3 for the valve solenoid SV2A, and thereby to effect operation of the hydraulic actuator 27 to elevate the finger plunger 92 out of initial or Number 1 position (see Fig. 13). In the course of upward movement, the finger plunger 92 actuates the levers 104, 117 and 127 to apply the pressure roller 108 (see Figs. 3b and 3c) and locating roller 118 against the piston and to project the finger 130 into one wrist pin boss.

Upon reaching its intermediate or Number 2 position (see Fig. 14), the plunger 92 opens limit switch LS3 to break the circuit for solenoid SV2A, thereby stopping the actuator 28, and simultaneously closes limit switch LS3A to complete a circuit through contacts HC3 and limit switch LS4 for valve solenoid SV3A. The front actuator 30 is now operated to shift the carrier 23 to the right from the initial or Number 1 position, thereby coacting with the clatter stop 136 to locate the piston axially with reference to the roller 118 and finger 130.

At its intermediate or Number 2 position (see

Fig. 8a), the carrier 23 opens limit switch LS4 to stop the actuator 30, and simultaneously closes limit switch LS4A to complete a circuit through contacts HC4, CR92, limit switch LS5A and contacts CR93 for relay R which closes contacts R1 to start the roller drive motor 33.

The piston W is now revolved in the cage for preliminary radial location effected by entry of the roller 118 into one wrist pin boss (see Fig. 3d). At this time, limit switch LS5A is opened to stop the roller drive motor 33, and limit switch LS5 is closed to complete a shunt circuit across LS3 through contacts HC4 and limit switch LS7 for solenoid SV2A, thereby constituting upward movement of the finger plunger 92 from the Number 2 position to the Number 3 position (see Fig. 15) to lift the piston from the rollers 66 into contact with the fixed clamp fingers 163 (see Fig. 3e) on the carrier 23. In this movement, the locating finger 130 in the other wrist pin boss rotates the piston into final radial position.

At the Number 3 position, the plunger 92 opens limit switch LS6 and closes limit switch LS6A to complete a circuit through contacts HC, for relay coils CR1 and TR1. Coil CR1 closes contacts CR11. Relay coil TR1 closes contacts TR1 to energize relay coil CR2 which closes contacts CR21 to energize valve solenoid SV419, and opens contacts CR22 to interrupt the circuit for relay coil CR9, and thereby prevent reenergization of solenoid SV2A. Solenoid SV4A effects operation of the actuator 29 to engage the movable clamp finger 166 (see Fig. 3f) with the piston W. Thus, the piston is now accurately located and gripped in the carrier 23.

As the piston is clamped, the carrier opens limit switch LS7 and closes limit switch LS7A to complete a circuit for relay coil CR3, and a circuit through limit switch LS8 for solenoid SV2B. The latter effects downward operation of the actuator 28 to retract the finger plunger 92. At the end of this movement, the plunger 92 opens limit switch LS8 to stop the actuator 28, and closes limit switch LS8A. Since relay coil CR3 has closed contacts CR31 and CR32, closing of switch LS8A completes a circuit through limit switches LS14, LS12, and LS9 for solenoid SV3A to advance the carrier 23 again to the right from the number 2 position. Contacts CR31 close a circuit through limit switch LS13 and contacts HC8 for a relay coil CR6, and the latter closes sealing contacts CR61 and opens contacts CR62 in the circuit for the solenoid SV6B to prepare the rear clamp for forward operation.

The carrier 23 advances the piston into the chuck into position to locate the bosses in axial alignment with the boring spindle 19, and in so doing ejects the previously bored piston into the discharge chute 210 (see Figs. 3g, 3h and 16). Upon reaching the number 3 position, the carrier opens limit switch LS9 and closes limit switch LS9A to stop the carrier advance and to complete a circuit through contacts HC7 and limit switch LS10 for solenoid SV6A. Thereupon, the actuator 31 (see Fig. 11) is operated to advance the rear clamp head 24 into the open end of the piston skirt until arrested by the stop 240, and then to advance the rod 226 independently so as to expand the scissors clamps 219 into gripping engagement with the interior of the piston (see Figs. 3i and 16). At the end of the advance, limit switch LS12 is opened and limit switch LS12A is closed to prepare a circuit for relay coil CR4. When the piston has been clamped, limit switch LS10 is opened and limit switch LS10A is closed to complete a circuit through limit switch LS13 for relay coils F and CR10, the latter opening contacts CR10, to break the shunt around the limit switch LS9.

Relay coil F closes contacts F, to start the tool spindle motor 25 in a forward direction, opens interlock contacts F2, and closes contacts F3 to complete a circuit through limit switch LS11 for solenoid SV4B and relay coil CR8, thereby causing release of the carrier clamping finger 166. Relay coil CR8 opens contacts CR81 to deenergize relay coil CR7 which permits opening of contacts CR72 and closing of contacts CR71. Upon release of the carrier clamp, limit switch LS11 opens, and limit switch LS11A closes to complete a circuit through limit switch LS1A for solenoid SV3B, and a circuit for relay coil CR4. Thereupon, the carrier 23 is returned to initial position, and the limit switch LS1 is again closed to drop another piston into the cage.

Relay coil CR4 actuates switch contacts CR4, CR42, CR43 and CR44 respectively to energize SV7A, establish a holding circuit, open the circuit for coils SV4B and CR8, and prepares the circuit for reverse relay coil IR. Solenoid SV7A effects forward feed of the tool head 18 in a program of rapid traverse and feed movements to perform the boring operation (see Fig. 3j). At the end of the boring stroke, limit switch LS13 is opened, and relay IR is momentarily energized to plug the spindle motor 25 to a stop. Limit switch LS13A is closed to energize time relay coil TR2 which closes contacts TR21 to energize relay coil CR5.

Relay coil CR5 opens contacts CR51 and CR52 to open the circuits for solenoid SV7A and coil CR4. Deenergization of coil CR4 opens the plugging circuit of coil IR. After a time delay, relay TR2 opens its contacts to deenergize relay CR5.

The tool head 18 is now returned to initial position by mechanical means, and thereupon limit switch LS14 is closed to energize solenoid SV6B to unclamp the work and retract the rear clamp into initial position.

Instead of operating the machine automatically, the general functions and timing may be manually controlled by the use of push buttons 1 to 13 inclusive.

I claim as my invention:

1. In a piston pin hole boring machine, in combination, a supporting frame, a work fixture mounted on said frame and having a bore therein adapted to receive a piston endwise with a snug, sliding fit in boring position, a support at one side of said fixture adapted to receive a piston in an initial position displaced from and in approximate axial alinement with said bore, a carrier mounted for reciprocation on said frame on the side of said support remote from said fixture and movable upon reciprocation thereof toward and away from said fixture, the end of said carrier adjacent said fixture having a disengageable clamp head for receiving and externally gripping the crown end of the piston when located in said support, means separate from said work fixture and carrier for rotating and transaxially shifting the piston while in said support to locate the piston radially and in axial alignment with said fixture bore, power means for actuating said clamp head to grip the piston in located position, and power means for actuating said carrier to advance the located piston from said support axially into said fixture bore, and electrical control means for effecting automatic operation of said power means in predetermined timed sequence to carry out the aforesaid functions in the order stated.

2. In a piston pin hole boring machine, in combination, a supporting frame, a support for receiving a piston having a crown portion and a skirt portion in an initial position, a work fixture mounted on said frame at one side of said support and adapted to receive the piston therefrom endwise with a snug sliding peripheral fit in a boring position, a carrier mounted for reciprocation on said frame at the other side of said support, locating means for rotating and transaxially shifting the piston in said support to locate the piston radially and in axial alignment with said fixture, the end of said carrier adjacent said support having a disengageable clamping head for receiving and externally gripping the crown portion of the piston, a second disengageable clamping head reciprocable on said frame on the side of said fixture opposite the carrier for movement into the skirt of the piston and operable to clamp the skirt internally and force the same against said fixture, and power means for actuating in successive timed sequence said locating means, said first mentioned head, said carrier and said second head to transfer and clamp the piston in said boring position.

3. In a piston pin hole boring machine, in combination, a supporting frame, a work fixture mounted on said frame and having a bore adapted to receive a piston having a skirt portion endwise with a snug sliding fit and a clamping mechanism for releasably securing the piston in said bore, said clamping mechanism comprising a tubular member reciprocable on said frame in axial alignment with said bore, normally contracted expansible scissors clamping elements pivotally mounted on the forward end of said member and bodily movable thereby into the open skirt end of the piston when located in said bore, an actuating plunger reciprocable in said ram, a wedge element pivoted to said plunger for engaging and expanding said elements with equalized clamping pressure into engagement with the interior of the piston skirt to expand the wall thereof into gripping engagement with the interior surface of said bore, spring means normally retracting said plunger, stop means for limiting forward movement of said member, and means connected to said plunger for advancing the same to move the plunger and ram jointly toward said work fixture until such time as said member engages said stop means and for thereafter moving said plunger to cause said wedge element to engage said clamping elements and expand the same into engagement with the skirt end of the piston.

4. In a piston pin hole boring machine, in combination, a supporting frame, a work fixture mounted on said frame and having a bore adapted to receive internally therein with a snug, sliding fit, a piston having an expandable skirt portion, and a clamping mechanism for releasably securing the piston in said bore, said clamping mechanism comprising a tubular member mounted for reciprocation on said frame and movable toward and away from said work fixture, a pair of scissors-like clamping elements pivotally mounted on the end of said member adjacent said work fixture and bodily movable with the member into the open skirt portion of the piston when the latter is located in said bore, an actuating plunger slidably disposed within said tubular member and movable from a retracted position to an advanced position wherein one end thereof engages said clamping members to spread the same, spring means normally maintaining said plunger in its retracted position, power actuated means connected to said plunger for moving the plunger and consequently the tubular member toward and away from said work fixture, and a limit stop positioned in the path of movement of said tubular member and adapted to be engaged by the latter when said plunger is moved toward said work fixture whereby continued movement of said plunger will cause the plunger to overrun the movements of said tubular member, and whereby the end thereof will engage said clamping members and spread the same into engagement with the skirt portion of the piston in said work fixture to spread the latter against the inner surface of the work fixture bore and clamp the piston in position within the work fixture.

5. In a piston wrist pin hole boring machine, a work receiving cage comprising, in combination, a supporting bracket adapted to be mounted on and to span the space between two separated base sections, said bracket having a central horizontal base plate and front and rear side members extending along said plate, two spaced bottom rollers supported above and extending respectively along opposite sides of said base plate between said side members, one of said side members having a facing of relatively soft material for directing an incoming piston into rest position on said rollers, a pressure roller mounted on said bracket for movement into and out of engagement with the periphery of the piston to maintain the latter in frictional contact with said first-mentioned rollers, means selectively operable to drive said first mentioned rollers whereby to rotate said piston, a roller engageable under yielding pressure in one wrist pin hole to locate the piston in a preliminary angular position on said bottom rollers, a carrier having fixed stop means over said bottom rollers, means operable to lift the piston transaxially from said bottom rollers into engagement with said stop means, means operable as the piston is lifted to rotate the piston into final angular position, and means for clamping the piston against said stop means.

6. In a piston pin hole boring machine, in combination, a work support having two parallel bottom rollers, means for introducing a piston in peripherally supported engagement with said rollers, a first lever on said support carrying a pressure roller and operable to apply said pressure roller under yieldable spring pressure against the piston in opposed relation to the bottom rollers, means for driving said bottom rollers, a second lever mounted on said support and having a locating element movable under yieldable spring pressure against the piston in position to enter one piston wrist pin hole as the piston is located to locate the piston in preliminary angular position, a third lever mounted on said support and having a locating element projectable into the other wrist pin hole, a shiftable carrier having spaced fingers located above said bottom rollers, a plunger movable vertically between said bottom rollers and operable to lift the piston from said rollers into engagement with said fingers, said last mentioned element being operable in the course of such lifting movement to rotate the piston into final angular position, cam means for actuating said levers and plunger forwardly and reversely in timed sequence, and means on said carrier for clamping the orientated piston against said fingers.

7. In a piston pin hole boring machine, in combination, a work support having two parallel bottom rollers, means for introducing a piston in peripherally supported engagement with said rollers, a first member on said support carrying a pressure roller and operable to apply said pressure roller under yieldable spring pressure against the piston in opposed relation to the bottom rollers, means for driving said bottom rollers, a second member mounted on said support and having a locating element movable under yieldable spring pressure against the piston in position to enter one piston wrist pin hole as the piston is rotated to locate the piston in preliminary angular position, a third member mounted on said support and having a locating element projectable into the other wrist pin hole, a carrier having a stop located above said bottom rollers, a fourth member operable to lift the piston from said rollers into engagement with said stop, said last mentioned element being operable in the course of such lifting movement to rotate the piston into final angular position, means for actuating said members in timed sequence, and means on said carrier for releasably clamping the orientated piston against said stop.

8. In a piston pin hole boring machine, in combination, a work support, means for introducing a piston rotatably onto said support, a first member on said support carrying a pressure element and operable to apply said element under yieldable spring pressure against the periphery of the piston in opposed relation to said support, means for rotating the piston on said support, a second member on said support and having a locating element movable under yieldable spring pressure against the piston in position to enter one piston wrist pin hole, a third member on said support and having a locating element projectable into the other wrist pin hole, a carrier having a stop located above said support, said elements being operable to locate the piston angularly, a fourth member movable to lift the piston from said support into engagement with said stop to locate the piston transaxially, means for operating said members in timed sequence, and means for clamping the orientated piston against said stop.

9. In a piston wrist pin hole boring machine, in combination, a support to receive a piston, a first plunger movable longitudinally of the piston successively from initial into second and third positions, a second plunger movable successively transaxially of the piston from initial into second and third positions, means operable by said first plunger in the first movement to shift the piston axially, means operable by said second plunger in the first movement to locate the piston angularly in a preliminary position, means operable by said second plunger in the second movement to shift the piston transaxially into a predetermined position of axial alignment and to locate the piston in final angular position, and means operable to clamp the piston to said first plunger, said first plunger in the second movement being operable to shift the clamped piston axially from said support.

10. In a piston pin hole boring machine, in combination, a frame, a work fixture mounted in fixed position on said frame and comprising a block having a bore opening therethrough and adapted to receive a piston endwise with a snug sliding fit, said block being formed with diametrically alined openings in opposite sides of the bore wall for the entry of a boring tool, a carrier mechanism located at one side of said block and comprising a ram reciprocable axially of said bore, a plurality of peripherally spaced clamping fingers on the forward end of said ram and arranged to receive and grip the crowned end of the piston and to transfer it axially into said bore in boring position axially with respect to said openings, one end of said block being formed with a series of slots opening radially to the corresponding end of said bore and corresponding in number and spacing to said fingers to receive the latter as the piston is inserted into said bore, and a clamping mechanism having normally contracted expansible scissors clamping elements movable into the open end of the piston to clamp the piston in said bore, said clamping elements being disposed in a plane substantially at right angles to the plane of said openings.

11. In a piston pin hole boring machine, in combination, a supporting frame, means for receiving and orientating a piston having a crown end angularly and transaxially in an initial position at a receiving station, a work fixture located at one side of said station to receive the orientated piston in boring position at a boring station, and a carrier mechanism located at the other side of said receiving station for transferring the piston from the latter to said work fixture, said carrier mechanism comprising a ram reciprocable on said frame and movable from a retracted position wherein it is out of engagement with said piston through an intermediate position wherein it engages the piston, to an advanced position wherein the piston is moved thereby onto said work fixture from said receiving station, a plurality of peripherally spaced clamping fingers on the forward end of said ram and adapted to straddle the crown end of the piston when said ram is moved to its intermediate position, one of said fingers being movable into clamping engagement with the crown end of the piston to cause the latter to be gripped by said clamping fingers, an actuating plunger slidably disposed within said ram and movable relative to the latter from a retracted position to an advanced position wherein it engages said movable finger and moves the same to its clamping position, and means operable in timed relationship for moving said ram from its retracted to its advanced position and operable when said ram assumes its intermediate position for moving said plunger to its advanced position for maintaining said plunger in its advanced position during movement of the ram from its intermediate to its advanced position.

12. In a boring machine, means positioned at a receiving station for receiving and orientating a generally cylindrical piston having diametrically opposed wrist pin holes formed therein preparatory to transfer of the piston bodily in orientated position to a boring station for boring purposes, said means comprising a pair of spaced supporting rollers mounted for rotation about a horizontal axis and adapted to receive and support therein and therebetween a piston to be orientated, a pressure roller movable into and out of engagement with the periphery of said piston about said supporting rollers to force the piston against the latter, a locating roller movable into and out of engagement with the periphery of said piston at one side thereof and in circumferential alinement with said wrist pin holes, a locating finger movable toward and away from the periphery of said piston at the other side thereof and in circumferential alinement with said wrist pin holes, means for rotating said supporting rollers to cause angular turning movement of said piston about its longitudinal axis, and means operable in timed relationship for moving said pressure roller, locating roller and locating finger to cause the pressure roller to force said piston against said supporting rollers for tractional purposes, to force said locating roller yieldingly against the periphery of said piston to cause the same to engage one of said wrist pin holes and terminate rotation of said piston by said supporting roller to establish an approximate position or orientation of the piston, and for thereafter moving said locating finger into the opposed wrist pin hole to cause accurate orientation of said piston.

GUENTHER BRINKMANN.

REFERENCES CITED

The following references are of record in the file of this patent:

UNITED STATES PATENTS

| Number | Name | Date |
|---|---|---|
| 324,198 | Wattie | Aug. 11, 1885 |
| 378,747 | Wattie | Feb. 28, 1888 |
| 1,285,584 | Baines et al. | Nov. 26, 1918 |
| 1,457,177 | Lee | May 29, 1923 |
| 1,571,021 | Meyer | Jan. 26, 1926 |
| 1,608,443 | Thacher | Nov. 23, 1926 |
| 1,945,662 | Smith | Feb. 6, 1934 |
| 2,025,706 | Birkebak | Dec. 31, 1935 |
| 2,353,184 | Nordquist | July 11, 1944 |